(12) United States Patent
Shahar et al.

(10) Patent No.: US 10,481,285 B1
(45) Date of Patent: Nov. 19, 2019

(54) SYSTEMS AND METHODS FOR DETERMINATION OF DEPTH OF INTERACTION

(71) Applicant: General Electric Company, Schenectady, NY (US)

(72) Inventors: Arie Shahar, Moshav Magshimim (IL); Yaron Glazer, Rehovot (IL); Moshe Cohen-Erner, Rehovot (IL); Avishai Ofan, Rehovot (IL)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 16/102,228

(22) Filed: Aug. 13, 2018

(51) Int. Cl.
  *G01T 7/00* (2006.01)
  *G01T 1/24* (2006.01)

(52) U.S. Cl.
  CPC .............. *G01T 7/005* (2013.01); *G01T 1/244* (2013.01)

(58) Field of Classification Search
  CPC .................................. G01T 7/005; G01T 1/244
  See application file for complete search history.

(56) References Cited

U.S. PATENT DOCUMENTS

| | | |
|---|---|---|
| 4,421,986 A | 12/1983 | Friauf et al. |
| 4,852,135 A | 7/1989 | Anisovich et al. |
| 5,148,809 A | 9/1992 | Biegleleisen-Knight et al. |
| 5,245,191 A | 9/1993 | Barber et al. |
| 5,273,910 A | 12/1993 | Tran et al. |
| 5,376,796 A | 12/1994 | Chan et al. |
| 5,504,334 A | 4/1996 | Jansen et al. |
| 5,562,095 A | 10/1996 | Downey et al. |
| 5,754,690 A | 5/1998 | Jackson et al. |
| 5,771,308 A | 6/1998 | Florent |

(Continued)

FOREIGN PATENT DOCUMENTS

| | | |
|---|---|---|
| WO | 2008135994 A2 | 11/2008 |
| WO | 2009036078 A2 | 3/2009 |
| WO | 2014173812 A1 | 10/2014 |

OTHER PUBLICATIONS

PCT Search Report and Written Opinion issued in connection with corresponding Application No. PCT/IL2014/050848 dated Feb. 5, 2015.

(Continued)

*Primary Examiner* — Hugh Maupin
(74) *Attorney, Agent, or Firm* — Dean D. Small; The Small Patent Law Group, LLC

(57) ABSTRACT

A detector assembly is provided that includes a semiconductor detector, plural pixelated anodes, and at least one processor. The plural pixelated anodes are disposed on a surface of the semiconductor detector. Each pixelated anode is configured to generate a primary signal responsive to reception of a photon and to generate at least one secondary signal responsive to an induced charge caused by reception of a photon by at least one surrounding anode. The at least one processor is operably coupled to the pixelated anodes and is configured to acquire a primary signal from one of the anodes responsive to reception of a photon; acquire at least one secondary signal from at least one neighboring pixel; and determine a depth of interaction in the semiconductor detector for the reception of the photon by the one of the anodes using the at least one secondary signal.

20 Claims, 12 Drawing Sheets

(56) References Cited

U.S. PATENT DOCUMENTS

| | | | |
|---|---|---|---|
| 5,825,033 | A | 10/1998 | Barrett et al. |
| 5,847,398 | A | 12/1998 | Shahar et al. |
| 6,002,741 | A | 12/1999 | Eisen et al. |
| 6,140,650 | A | 10/2000 | Berlad |
| 6,169,287 | B1 | 1/2001 | Warburton |
| 6,239,438 | B1 | 5/2001 | Schubert |
| 6,388,244 | B1 | 5/2002 | Gagnon |
| 6,535,229 | B1 | 3/2003 | Kraft |
| 6,618,185 | B2 | 9/2003 | Sandstrom |
| 6,748,044 | B2 | 6/2004 | Sabol et al. |
| 6,943,355 | B2 | 9/2005 | Schwartz et al. |
| 7,026,623 | B2 | 4/2006 | Oaknin et al. |
| 7,187,790 | B2 | 3/2007 | Sabol et al. |
| 7,381,959 | B2 | 6/2008 | Manjeshwar et al. |
| 7,490,085 | B2 | 2/2009 | Walker et al. |
| 7,495,228 | B1 | 2/2009 | Albagli et al. |
| 7,508,509 | B2 | 3/2009 | Lehitkoski et al. |
| 7,668,288 | B2 | 2/2010 | Conwell et al. |
| 7,671,331 | B2 | 3/2010 | Hefetz |
| 7,692,156 | B1 | 4/2010 | Nagarkar |
| 8,280,124 | B2 | 10/2012 | Dichterman et al. |
| 8,405,038 | B2 | 3/2013 | Bouhnik et al. |
| 8,492,725 | B2 | 7/2013 | Zilberstein et al. |
| 9,002,084 | B2 | 4/2015 | Shahar et al. |
| 2002/0191828 | A1 | 12/2002 | Colbeth et al. |
| 2003/0099026 | A1 | 5/2003 | Sandstrom |
| 2003/0128324 | A1 | 7/2003 | Woods et al. |
| 2003/0153830 | A1 | 8/2003 | Weinberg et al. |
| 2004/0021082 | A1 | 2/2004 | Wong et al. |
| 2004/0174949 | A1 | 9/2004 | Yamashita et al. |
| 2004/0195512 | A1 | 10/2004 | Crosetto |
| 2005/0139777 | A1 | 6/2005 | Rostaing et al. |
| 2005/0145797 | A1 | 7/2005 | Oaknin et al. |
| 2005/0251010 | A1 | 11/2005 | Mistretta et al. |
| 2006/0086913 | A1 | 4/2006 | Spahn |
| 2006/0108532 | A1 | 5/2006 | Ohana et al. |
| 2006/0113482 | A1 | 6/2006 | Pelizzari et al. |
| 2006/0249682 | A1 | 11/2006 | Hogg et al. |
| 2006/0285751 | A1 | 12/2006 | Wu et al. |
| 2007/0018108 | A1 | 1/2007 | Kitamura |
| 2007/0023669 | A1 | 2/2007 | Hefetz et al. |
| 2007/0025522 | A1 | 2/2007 | Fenster et al. |
| 2007/0173719 | A1 | 7/2007 | Haider |
| 2007/0235657 | A1* | 10/2007 | He .................... G01T 7/005 250/389 |
| 2008/0001090 | A1 | 1/2008 | Ben-Haim et al. |
| 2008/0029704 | A1 | 2/2008 | Hefetz et al. |
| 2008/0033291 | A1 | 2/2008 | Rousso et al. |
| 2008/0039721 | A1 | 2/2008 | Shai et al. |
| 2008/0042070 | A1* | 2/2008 | Levin .................. H04N 5/32 250/370.13 |
| 2008/0092074 | A1 | 4/2008 | Cohen |
| 2008/0149842 | A1 | 6/2008 | El-Haney et al. |
| 2009/0070121 | A1 | 3/2009 | Leonelli et al. |
| 2009/0110144 | A1 | 4/2009 | Takahashi et al. |
| 2010/0261997 | A1 | 10/2010 | Ren et al. |
| 2010/0308817 | A1 | 12/2010 | Vija et al. |
| 2011/0026685 | A1 | 2/2011 | Zilbertsein et al. |
| 2011/0103544 | A1 | 5/2011 | Hermony et al. |
| 2011/0147594 | A1 | 6/2011 | Scoullar et al. |
| 2011/0155918 | A1 | 6/2011 | Bouhnik |
| 2011/0240865 | A1 | 10/2011 | Frach et al. |
| 2012/0108948 | A1 | 5/2012 | Jansen et al. |
| 2012/0205542 | A1 | 8/2012 | Goedicke et al. |
| 2013/0168567 | A1 | 7/2013 | Wartski et al. |
| 2014/0048714 | A1 | 2/2014 | Shahar et al. |
| 2014/0126793 | A1 | 5/2014 | Ahn et al. |
| 2014/0158890 | A1 | 6/2014 | Pistorius et al. |
| 2014/0163368 | A1 | 6/2014 | Rousso et al. |
| 2014/0343400 | A1 | 11/2014 | Takayama et al. |
| 2015/0063671 | A1 | 3/2015 | Shahar et al. |
| 2017/0014096 | A1 | 1/2017 | Bouhnik et al. |
| 2017/0350995 | A1* | 12/2017 | Stanchina ............. G01T 1/2928 |

OTHER PUBLICATIONS

Meikle et al., "Accelerated EM reconstruction in total-body PET: potential for improving tumour detectability," 1994, Physics in Medicine and Biology, vol. 39, pp. 1689-1704.

Park et al., "Performance of a high-sensitivity dedicated cardiac SPECT scanner for striatal uptake quantification in the brain based on analysis of projection data," Med. Phys. 40 (4), Apr. 2013.

Riddell et al., "Noise reduction in oncology FDG PET images by iterative reconstruction: a quantitative assessment," 2001, the Journal of Nuclear Medicine, vol. 42, No. 9, pp. 1316-1323.

Shepp et al., "Maximum likelihood reconstruction for emission tomography," 1982, IEEE Transaction on Medical Imaging, vol. MI-1, No. 2, pp. 113-121.

Zhu, "Digital Signal Processing Methods for Pixelated 3-D Position Sensitive Room-Temperature Semiconductor Detectors" (2012) p. 1-184, available at: https://deepblue.lib.umich.edu/handle/2027.42/91490.

Warburton, "An approach to sub-pixel spatial resolution in room temperature X-Ray detector arrays with good energy Resolution", Mat. Res. Symp Proc. 487, 531-535, 1988.

International Search Report and Written Opinion dated Jul. 15, 2016 for corresponding PCT Application No. PCT/US2016/029465 filed Apr. 27, 2016 (11 pages).

Barrett, "Charge Transport in Arrays of Semiconductor Gamma-Ray Detectors," H.H. Barrett, Physical Review Letters, vol. 75, No. 1, Jul. 1995.

Eskin, "Signals Induced in Semiconductor Gamma-Ray Imaging Detectors," J.D. Eskin, Journal of Applied Physics, vol. 85, No. 2, Jan. 1999.

Niemela, "High-Resolution p-i-n. CdTe and CdZnTe X-Ray Detectors with Cooling and Rise-Time Discrimination," IEEE Transactions on Nuclear Science, vol. 43, No. 3, Jun. 1996.

\* cited by examiner

SYSTEMS AND METHODS FOR DETERMINATION OF DEPTH OF INTERACTION

BACKGROUND OF THE INVENTION

The subject matter disclosed herein relates generally to apparatus and methods for diagnostic medical imaging, such as Nuclear Medicine (NM) imaging.

In NM imaging, for example, systems with multiple detectors or detector heads may be used to image a subject, such as to scan a region of interest. For example, the detectors may be positioned adjacent the subject to acquire NM data, which is used to generate a three-dimensional (3D) image of the subject.

Imaging detectors may be used to detect reception of photons from an object (e.g., human patient that has been administered a radiotracer) by the imaging detector. The depth of interaction (DOI) or location along the thickness of a detector at which photons are detected may affect the strength of the signals generated by the detector responsive to the photons and be used to determine the number and location of detected events. Accordingly, the DOI may be used to correct detector signals to improve detector energy resolution and sensitivity. However, conventional approaches to determining DOI utilize signals from a cathode, requiring additional hardware and assembly complexity to utilize hardware to collect and process cathode signals. Also, cathodes tend to be relatively large and produce relatively noisy signals, reducing the accuracy and effectiveness of using signals from cathodes.

BRIEF DESCRIPTION OF THE INVENTION

In one embodiment, a radiation detector assembly is provided that includes a semiconductor detector, plural pixelated anodes, and at least one processor. The semiconductor detector has a surface. The plural pixelated anodes are disposed on the surface. Each pixelated anode is configured to generate a primary signal responsive to reception of a photon by the pixelated anode and to generate at least one secondary signal responsive to an induced charge caused by reception of a photon by at least one surrounding anode. The at least one processor is operably coupled to the pixelated anodes and is configured to acquire a primary signal from one of the anodes responsive to reception of a photon by the one of the anodes; acquire at least one secondary signal from at least one neighboring pixel of the one of the anodes responsive to an induced charge caused by the reception of the photon by the one of the anodes; and determine a depth of interaction in the semiconductor detector for the reception of the photon by the one of the anodes using the at least one secondary signal.

In another embodiment, a method of imaging using a semiconductor detector is provided. The semiconductor detector has a surface with plural pixelated anodes disposed thereon. Each pixelated anode is configured to generate a primary signal responsive to reception of a photon by the pixelated anode and to generate at least one secondary signal responsive to an induced charge caused by reception of a photon by at least one surrounding anode. The method includes acquiring a primary signal from one of the anodes responsive to reception of a photon by the one of the anodes, and acquiring at least one secondary signal from at least one neighboring pixel of the one of the anodes responsive to an induced charge caused by the reception of the photon by the one of the anodes. The method also includes determining a depth of interaction in the semiconductor detector for the reception of the photon by the one of the anodes using the at least one secondary signal.

In another embodiment, a method includes providing a semiconductor detector having a surface with plural pixelated anodes disposed thereon. Each pixelated anode is configured to generate a primary signal responsive to reception of a photon by the pixelated anode and to generate at least one secondary signal responsive to an induced charge caused by reception of a photon by at least one adjacent anode. The method also includes operably coupling the pixelated anodes to at least one processor. Further, the method includes providing a calibrated radiation supply at different depths along a sidewall of the semiconductor detector, wherein the pixelated anodes generate primary signals and secondary signals responsive to the calibrated radiation supply. Also, the method includes acquiring, with the at least one processor, the primary signals and the secondary signals from the pixelated anodes. The method further includes determining corresponding negative values of total induced charges for each of the different depths, and determining calibration information based on the negative values of the total induced charges for each of the different depths.

DETAILED DESCRIPTION OF THE INVENTION

Figure 1:
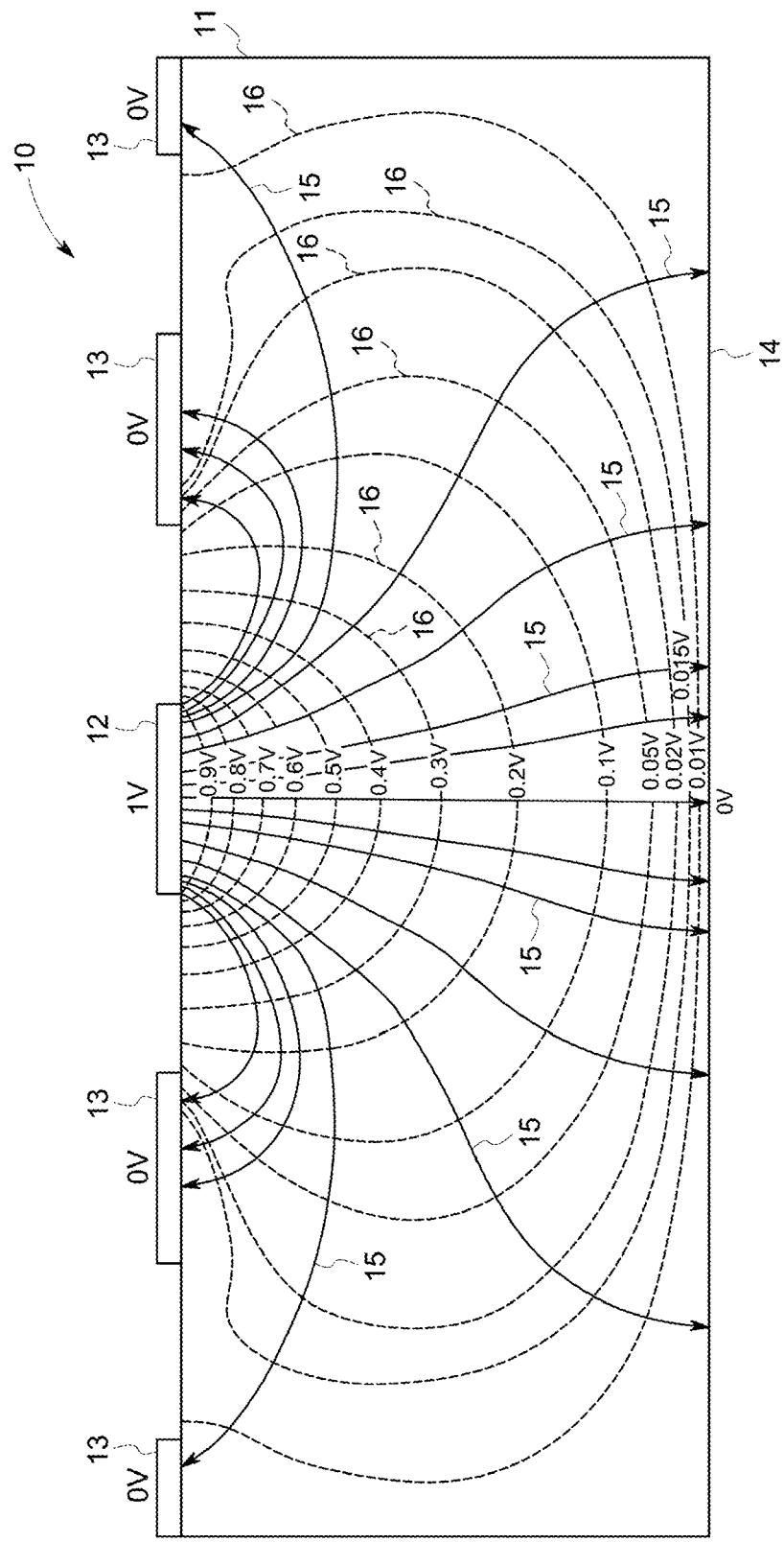
FIG. 1 depicts a representation of weighting potentials of a detector having a pixel biased by a voltage potential.

The following detailed description of certain embodiments will be better understood when read in conjunction with the appended drawings. To the extent that the figures illustrate diagrams of the functional blocks of various embodiments, the functional blocks are not necessarily indicative of the division between hardware circuitry. For example, one or more of the functional blocks (e.g., processors or memories) may be implemented in a single piece of hardware (e.g., a general purpose signal processor or a block of random access memory, hard disk, or the like) or multiple pieces of hardware. Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, the terms "system," "unit," or "module" may include a hardware and/or software system that operates to perform one or more functions. For example, a module, unit, or system may include a computer processor, controller, or other logic-based device that performs operations based on instructions stored on a tangible and non-transitory computer readable storage medium, such as a computer memory. Alternatively, a module, unit, or system may include a hard-wired device that performs operations based on hard-wired logic of the device. Various modules or units shown in the attached figures may represent the hardware that operates based on software or hardwired instructions, the software that directs hardware to perform the operations, or a combination thereof.

"Systems," "units," or "modules" may include or represent hardware and associated instructions (e.g., software stored on a tangible and non-transitory computer readable storage medium, such as a computer hard drive, ROM, RAM, or the like) that perform one or more operations described herein. The hardware may include electronic circuits that include and/or are connected to one or more logic-based devices, such as microprocessors, processors, controllers, or the like. These devices may be off-the-shelf devices that are appropriately programmed or instructed to perform operations described herein from the instructions described above. Additionally or alternatively, one or more of these devices may be hard-wired with logic circuits to perform these operations.

As used herein, an element or step recited in the singular and preceded with the word "a" or "an" should be understood as not excluding plural of said elements or steps, unless such exclusion is explicitly stated. Furthermore, references to "one embodiment" of are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Various embodiments provide systems and methods for improving the sensitivity and/or energy resolution of image acquisition, for example in Nuclear Medicine (NM) imaging applications. In various embodiments, measurements of non-collected (or induced) adjacent transient signals are utilized to determine a depth of interaction (DOI) of corresponding events in a detector. It may be noted that the same measurements of the non-collected adjacent transient signals may also be used to determine corresponding sub-pixel locations for the events.

Generally, various embodiments provide methods and/or systems for measuring the negative value of induced signals and deriving or determining the corresponding DOI based on the negative value. For certain values of DOI (e.g., DOI's not located near an anode), all events having the same DOI produce about the same negative value for non-collected induced signals, regardless of their lateral position (with lateral position defined as x, y coordinates where the DOI is measured along a z axis). Accordingly, various embodiments use a measured value of induced signals (e.g., a measured negative value of non-collected induced signals, which may also be used for sub-pixel location determination) to derive or determine the DOI as well as to provide 3D positioning of events causing the non-collected induced signals.

A technical effect provided by various embodiments includes increased sensitivity and/or energy resolution of a detector system, such as a NM imaging detector system. A technical effect of various embodiments includes improved image quality. A technical effect of various embodiments includes reduced processing and/or hardware complexity associated with determining DOI via the elimination of use of signals from a cathode.

Before addressing specific aspects of particular embodiments, certain aspects of detector operation are discussed. FIG. 1 depicts a representation 10 of weighting potentials for a detector 11 having a pixelated anode 12 biased by a potential of 1 volt. Neighboring pixelated anodes 13 are not biased, or are at a ground potential of 0 volts. It may be noted that the depiction of a given pixelated anode at a voltage whereas neighboring pixelated anodes are not biased in connection with various examples herein is provided for clarity of illustration and ease of depiction; however, in practice each pixelated anode of a detector may be biased by a similar voltage. In the example depicted in FIG. 1, the cathode 14 is grounded at 0 volts. Solid curves 15 show lines of the electrical field, with dashed curves 16 showing lines of equipotential. The lines of equipotential are perpendicular to the lines of electrical field at the points where the lines cross.

The weighting potentials of FIG. 1 are depicted according to the Shockley-Ramo theorem. Under this theorem, the induced current produced by the weighting potential is described by $i=qE*V=qE*V*\cos(a)$, where i is the induced current, q is the electron charge, and $E*V$ is the scalar product between the electrical field E of the weighting potential and the velocity V of the electron, and a is the angle between the vectors E and V.

Figure 2:
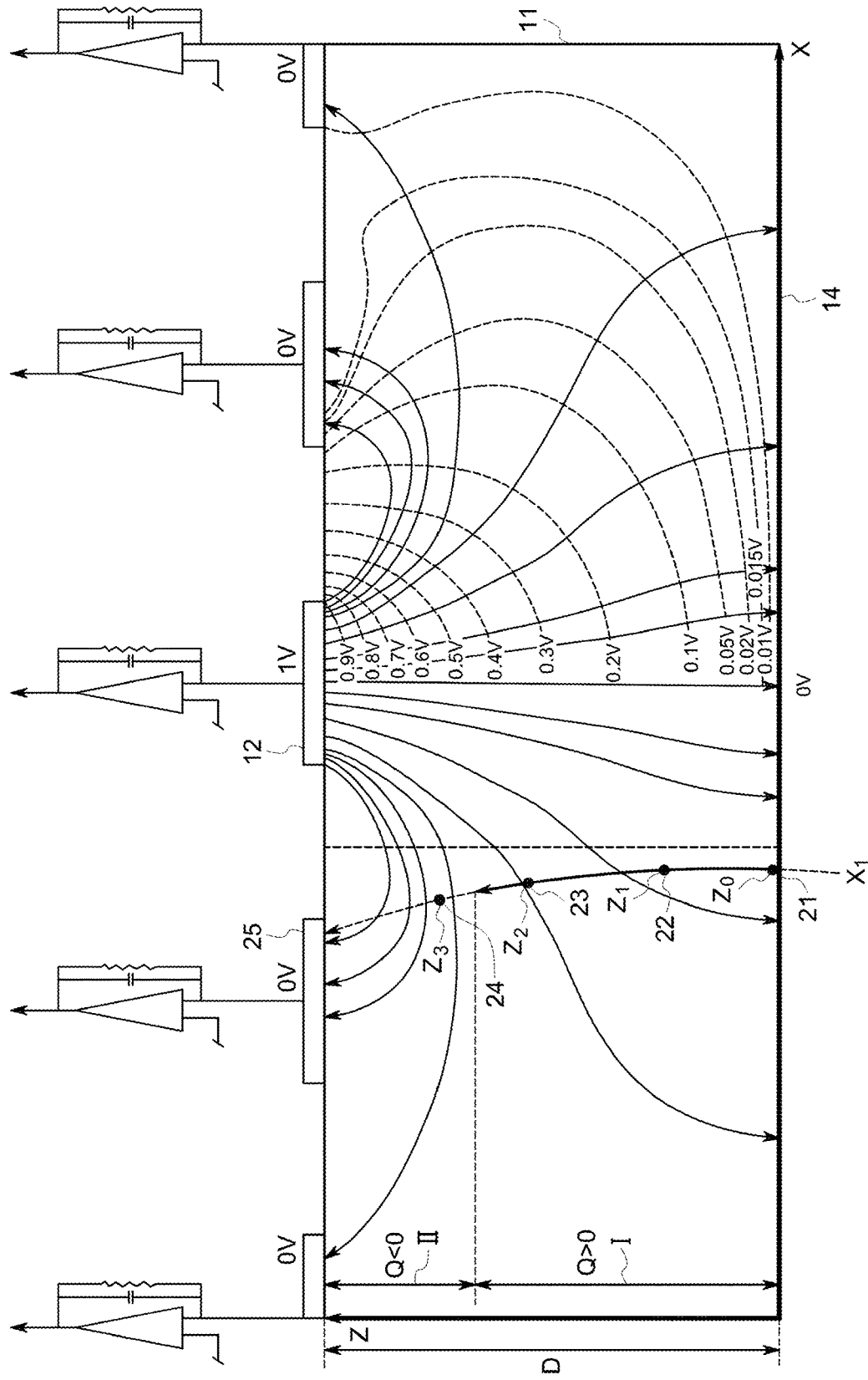
FIG. 2 depicts four events within the detector of FIG. 1.
Figure 3:
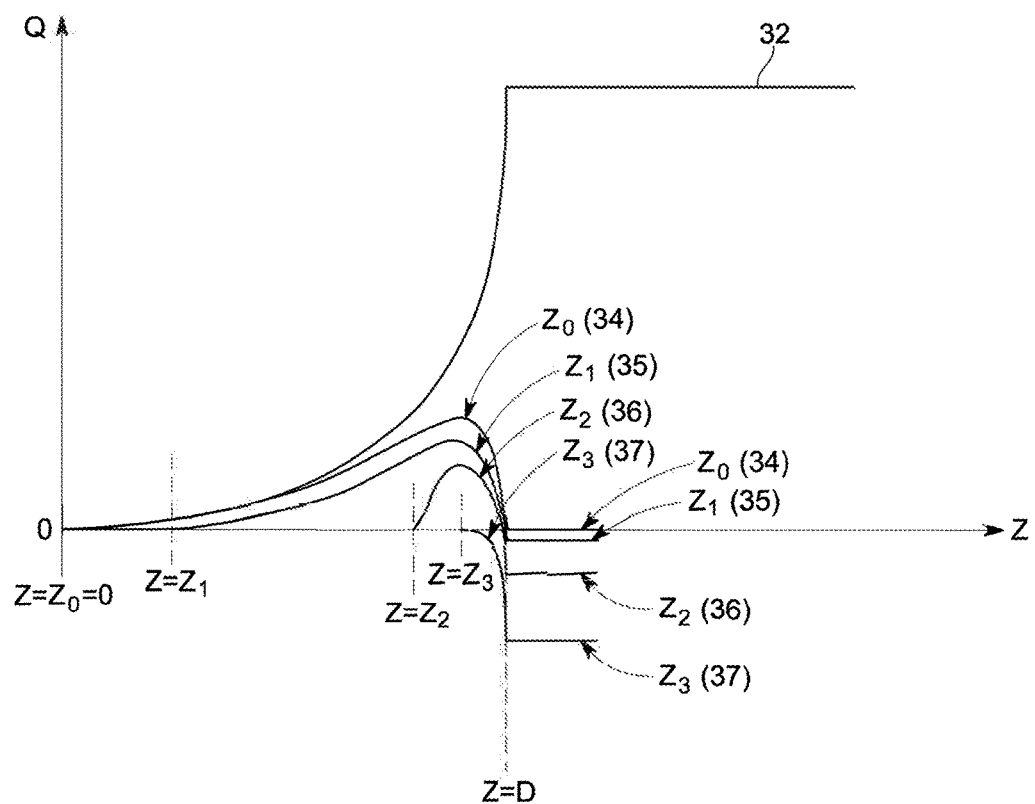
FIG. 3 depicts corresponding induced charges for the four events of FIG. 2.

FIGS. 2 and 3 depict the occurrence of events in various locations of the detector 11 and resulting induced charges. FIG. 2 depicts four events within the detector 11 of FIG. 1, and FIG. 3 depicts corresponding induced charges.

FIG. 2 depicts four events—event 21 starting at a depth of $Z_0$, event 22 starting at a depth of $Z_1$, event 23 starting a depth of $Z_2$, and event 24 starting at a depth of $Z_3$. Each of the events moves along a trajectory starting at $X_1$ and ending at the anode of the primary or collecting pixel 25 (the anode that collects the events). The non-collected induced charge on the adjacent pixel (or non-collecting pixel, in this case pixel 12, which is immediately neighboring the collecting pixel 25 in the illustrated example) is the integral over time (or over distance) of the current given by the relationship discussed above ($i=qE*V=qE*V*\cos(a)$). E is the field of the weighting potential of the non-collecting adjacent pixel (pixel 12 in this example). Two ranges are shown over the depth D of the detector—a first range I, and a second range II.

In range I, the vector of the field has a component directed downward. Accordingly, the induced charge is positive over range I. Over range II, the vector of the field has a component that is directed upward. Accordingly, the induced charge is negative over range II. Event 21 at depth $Z_0$ starts at the cathode 14 and accordingly the related charge travels over the entire length of range I and range II. The other events start away from the cathode and accordingly the related charges do not travel over the entire depth of range I. Further, the event 24 at depth $Z_3$ starts within the boundary of range II, closer to the pixelated anodes than is the boundary of range II. Accordingly, the charge related to event 24 at depth $Z_3$ does not travel over the entire depth of range II.

FIG. 3 depicts resulting signals corresponding to the events of FIG. 2. Namely, signal 32 depicts the collecting or primary signal resulting in the collecting pixel 25. Signal 34 depicts the non-collecting signal of pixelated anode 12 resulting from event 21 starting at $Z_0$, signal 35 depicts the non-collecting signal of pixelated anode 12 resulting from event 22 starting at $Z_1$, signal 36 depicts the non-collecting signal of pixelated anode 12 resulting from event 23 starting at $Z_2$, and signal 37 depicts the non-collecting signal of pixelated anode 12 resulting from event 24 starting at $Z_3$.

As seen in FIG. 3, for the event 21 starting at $Z_0$ (the event occurring at the cathode 14 and traveling over the entire range of both range I and II), the total induced charge in ranges I and II is zero, as the positive induced charge in range I and the negative induced charge in range II are equal and cancel each other out over the full depth (e.g., at the anodes where Z=D, where D is the thickness of detector 11).

For the event 22 starting at $Z_1$ (which is away from the cathode), the total induced charge is negative, as the positive induced charge in range I is less than that from event 21, as the charge from event 22 does not traverse the entire depth of range I. Similarly, the total induced charge from event 23 is more negative than the total induced charge from event 22, and the total induced charge from event 24 is more negative than the total induced charge from event 23. This may be represented as $[Q_0=0]>[Q_1<0]>[Q_2<0]>[Q_3<0]$, where $Q_0$ is the total induced charge for event 21 starting at $Z_0$, where $Q_1$ is the total induced charge for event 22 starting at $Z_1$, where $Q_2$ is the total induced charge for event 23 starting at $Z_2$, and where $Q_3$ is the total induced charge for event 24 starting at $Z_3$, Accordingly, as seen in FIG. 3, the closer an event is to the pixelated anodes (or farther from the cathode), the more negative the signal from a non-collected anode will tend to be.

Figure 4:
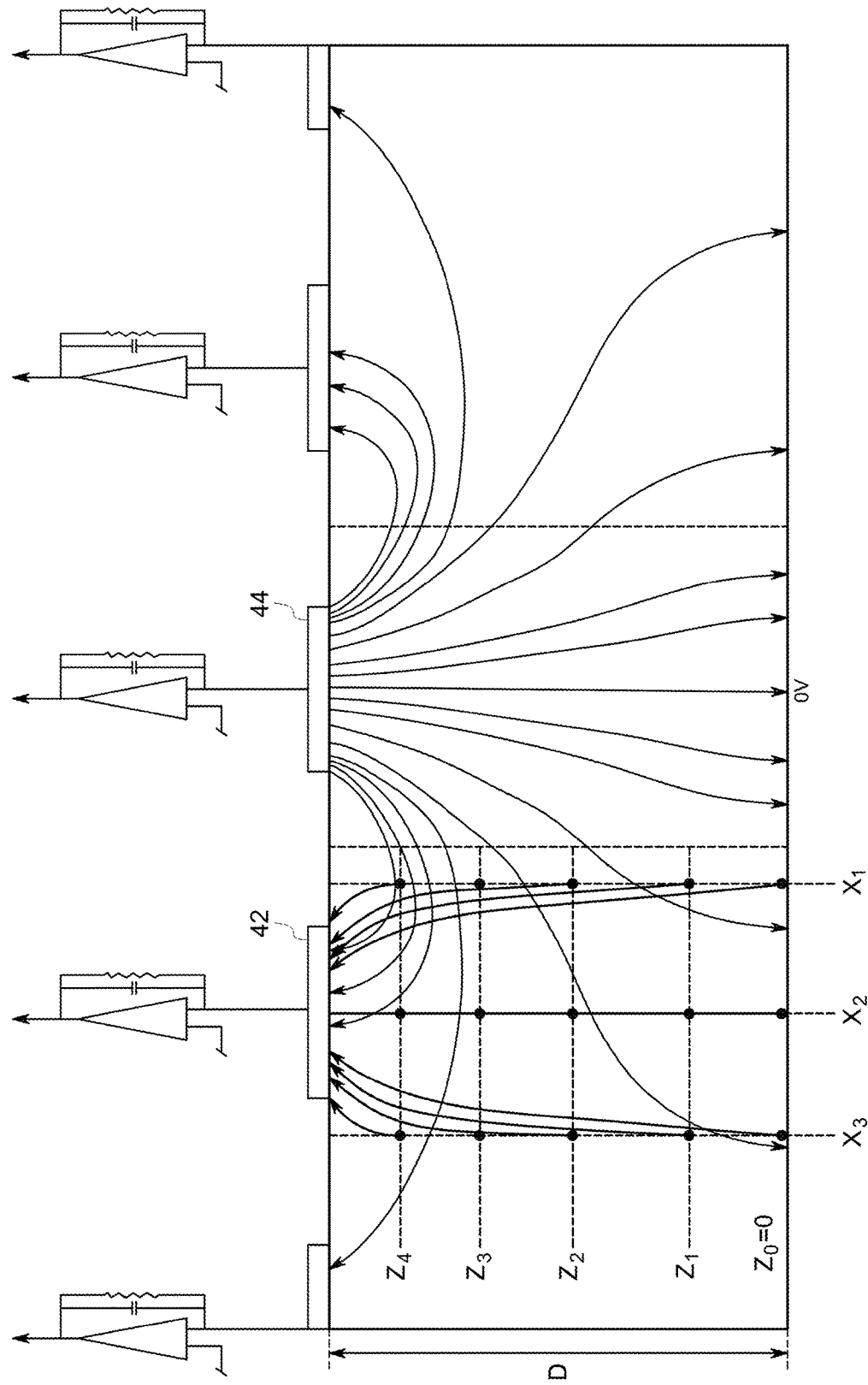
FIG. 4 depicts five groups of events under a primary or collecting pixel located at five different DOI's.

FIG. 4 depicts five groups of events under a primary pixel 42 (the collecting pixel that generates a primary signal) located at five different DOI's: $Z_0$, $Z_1$, $Z_2$, $Z_3$, $Z_4$. Each group includes three events located at different X coordinates (namely $X_1$, $X_2$, and $X_3$) for a particular depth. The trajectories for each event moving toward the primary anode 42 (e.g., anode 25 of FIG. 2) are schematically shown in FIG. 4. These events move in the weighted potential and electrical field of the adjacent non-collecting pixel 44 (e.g., anode 12 of FIGS. 1 and 2) on which the non-collected charge is induced, resulting in a secondary signal generated by the adjacent, non-collecting pixel 44.

Figure 5:
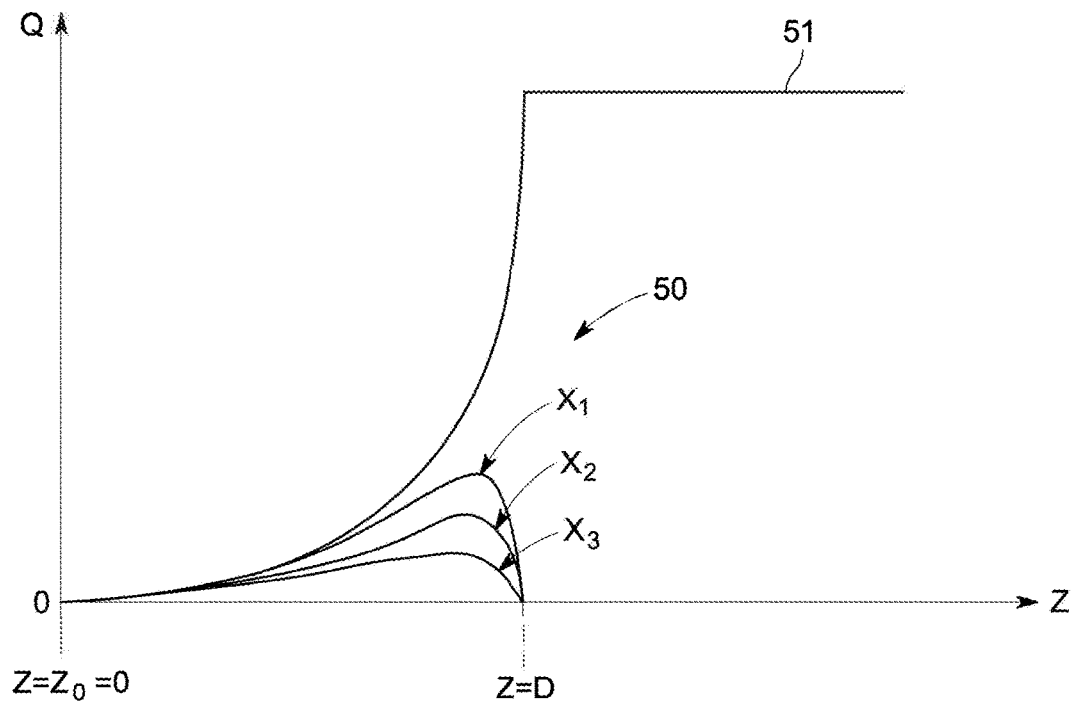
FIG. 5 depicts the resulting non-collected or secondary signals for the events located at $Z_0$ of FIG. 4.

The resulting induced non-collected or secondary signals produced by each event are depicted in FIGS. 5-9. FIG. 5 includes a graph 50 that depicts the resulting non-collected or secondary signals for the events located at $Z_0$. As seen in FIG. 5, despite the fact that the group of events at $Z_0$ have different lateral locations $X_1$, $X_2$, and $X_3$, they all produce the same total non-collected induced charge signal that is equal to zero. It may be noted that all of the events at $Z_0$ start at the cathode. Curve 51 in FIG. 5 is the primary collected signal at primary anode 42, and is shown in FIG. 5 to help illustrate the differences between the primary signal and the secondary induced signal in terms of amplitude and shape.

Figure 6:
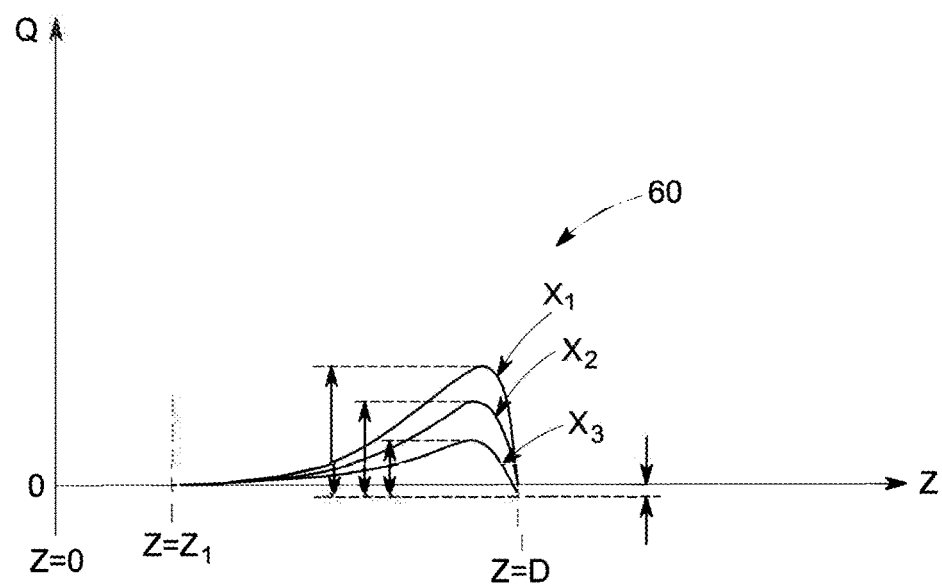
FIG. 6 depicts the resulting non-collected or secondary signals for the events located at $Z_1$ of FIG. 4.

FIG. 6 includes a graph 60 depicts the resulting non-collected or secondary signals for the events located at $Z_1$. As seen in FIG. 6, despite the fact that the group of events at $Z_1$ have different lateral locations $X_1$, $X_2$, and $X_3$, they all produce the same (or very nearly the same) total non-collected induced charge signal that is negative. It may be noted that all of the events at $Z_1$ start a small distance from the cathode and accordingly have a negative induced charge of a relatively small magnitude.

Figure 7:
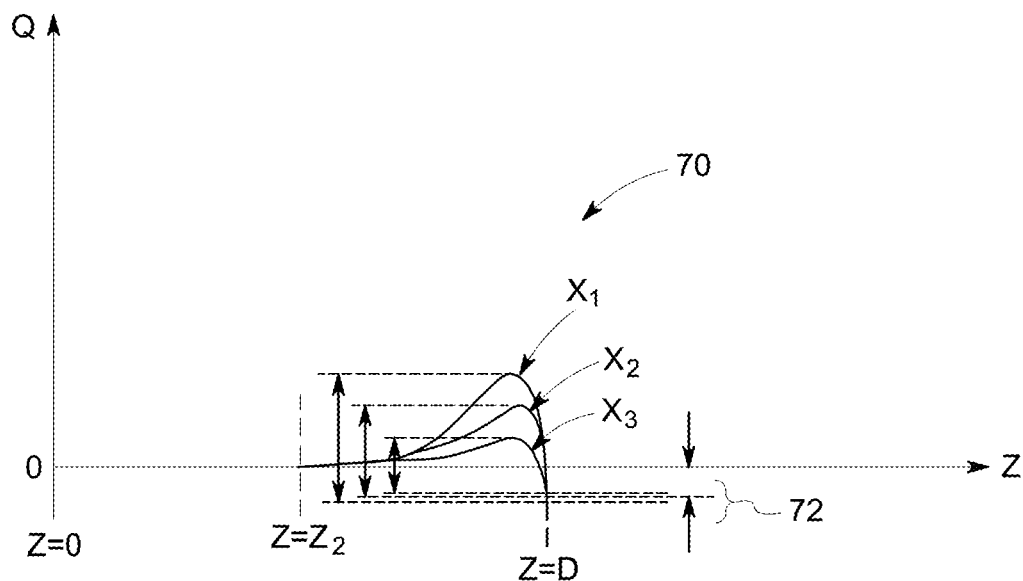
FIG. 7 depicts the resulting non-collected or secondary signals for the events located at $Z_2$ of FIG. 4.

FIG. 7 includes a graph 70 depicts the resulting non-collected or secondary signals for the events located at $Z_2$. As seen in FIG. 7, despite the fact that the group of events at $Z_2$ have different lateral locations $X_1$, $X_2$, and $X_3$, they all produce about the same total non-collected induced charge signal that is negative (e.g., within range 72). It may be noted that all of the events at $Z_2$ start a larger distance from the cathode than for the event at $Z_1$ and accordingly have a relatively more negative induced charge of a relatively small magnitude.

Figure 8:
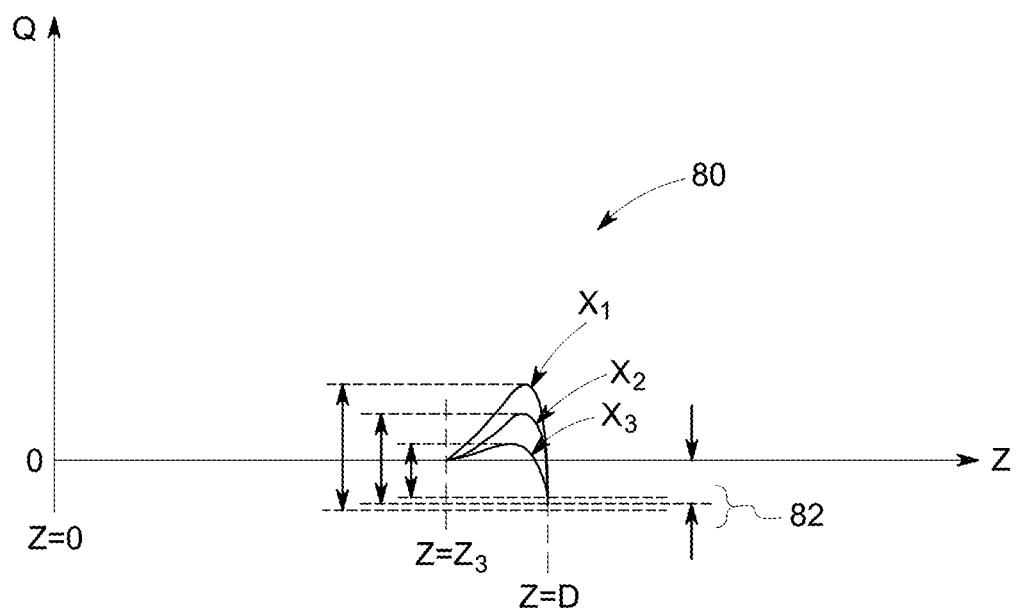
FIG. 8 depicts the resulting non-collected or secondary signals for the events located at $Z_3$ of FIG. 4.

FIG. 8 includes a graph 80 that depicts the resulting non-collected or secondary signals for the events located at $Z_3$. As seen in FIG. 8, despite the fact that the group of events at $Z_3$ have different lateral locations $X_1$, $X_2$, and $X_3$, they all produce about the same total non-collected induced charge signal that is negative (e.g., within range 82). It may be noted that all of the events at $Z_3$ start a larger distance from the cathode than for the event at $Z_2$ (and $Z_1$) and accordingly have a relatively more negative induced charge of a relatively small magnitude. It may be noted that the difference between the upper and lower value for the range 82 and the range 72 (see FIG. 7) are small enough to be ignored in various embodiments, so that the DOI is treated as independent of the lateral location.

Figure 9:
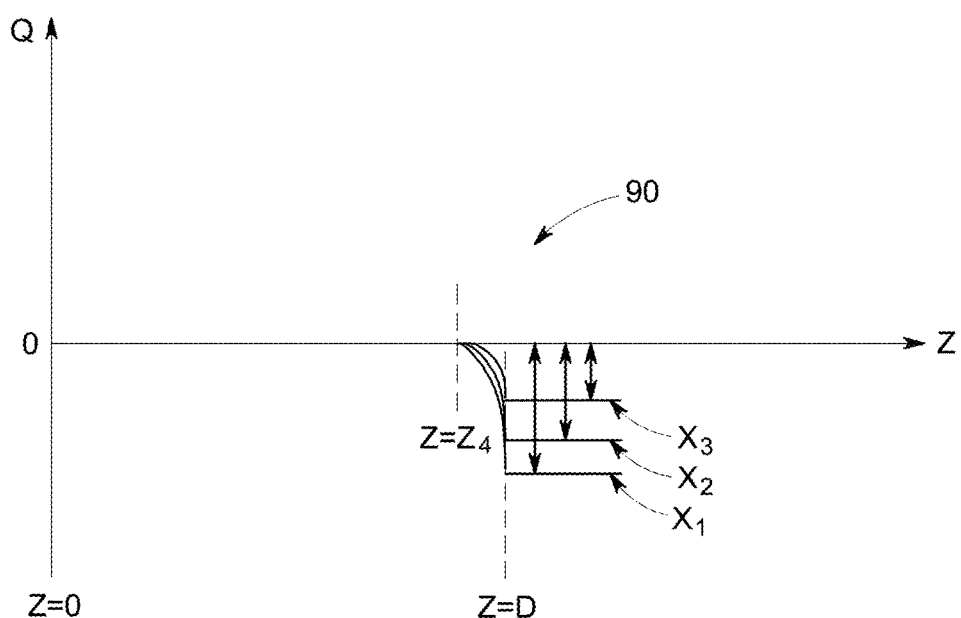
FIG. 9 depicts the resulting non-collected or secondary signals for the events located at $Z_4$ of FIG. 4.

FIG. 9 includes a graph 90 that depicts the resulting non-collected or secondary signals for the events located at $Z_4$. The negative charges for the events originating at a depth of $Z_4$ are substantially different from each other, due to the proximity of $Z_4$ to the anodes. Generally, in the illustrated example, as the depth of the event moves closer to the anode, the variability in the negative induced charge based on lateral position increases, with the variability becoming substantial only at depths very close to the anode.

As discussed above, except for events that start very close to a collecting anode, events produce a total non-collected induced charge in one or more adjacent anodes to the collecting anode that is correlated to the DOI of the event, substantially independent of lateral position. Accordingly, the total induced charge caused by an event on the adjacent pixelated anode (or pixelated anodes) that is zero or negative may be utilized for deriving or determining the DOI of the particular event. It may further be noted that due to the high absorption of the detector, very few events start close to the anodes, and accordingly such events may have a negligible effect on the use of negative induced charge to determine DOI. Various embodiments and methods disclosed herein accordingly determine a magnitude for a negative induced non-collected signal (also referred to herein as a secondary signal), and use the determined negative signal magnitude value to determine or derive DOI.

As discussed above, in various embodiments the DOI of an event may be derived from a correlation between the DOI of the event and the total non-collected induced charge on the adjacent pixel (or pixels) which is zero or negative, with the correlation between the DOI and the total non-collected induced charge being substantially independent of lateral position, such that lateral position may be disregarded in deriving the DOI. However, it may be noted that, for example, different photons may have different energies that can produce a different value for the total non-collected induced charge. Accordingly, in various embodiments, a detector system may be calibrated to account for different photon energies, for example to normalize the non-collected induced charge value to photon energy. Such a calibration process may be performed to provide calibration information that is used to determine DOI. The calibration information may be in the form of a look-up table, as one example, or in the form of a formula or mathematical expression based on a curve fitting, as another example.

Figure 10:
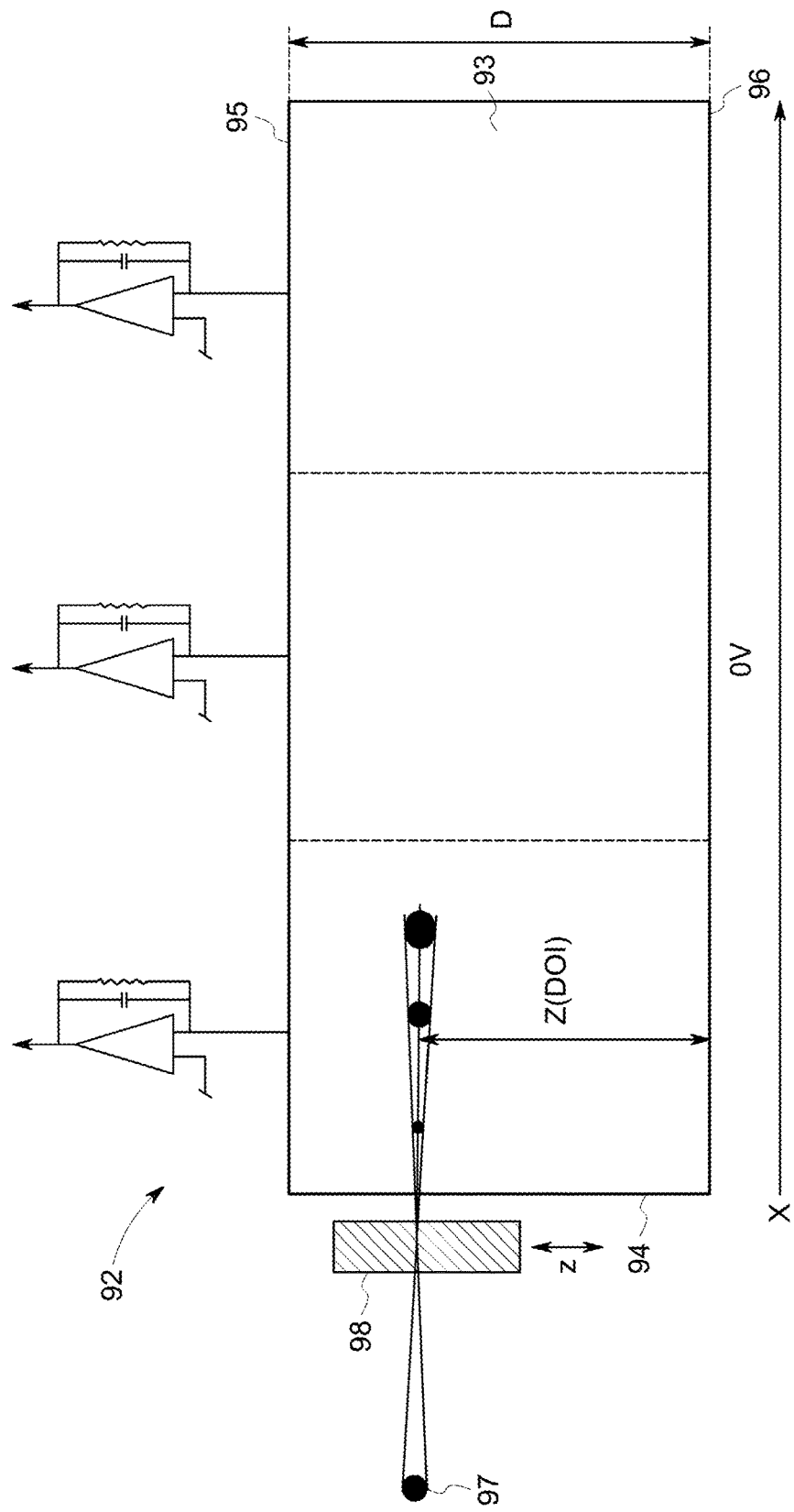
FIG. 10 depicts a calibration system in accordance with various embodiments.

FIG. 10 depicts a calibration system 92 in accordance with an embodiment. The depicted calibration system 92 is utilized to calibrate a detector 93 having a sidewall 94 that extends between an anode surface 95 and a cathode surface 96. The calibration system 92 includes a radiation source 97 and a pinhole collimator 98. The pinhole collimator 98 defines a scanning aperture that may be moved along the Z direction as seen in FIG. 10 to irradiate the sidewall 94 of the detector 93 at different DOI's (different Z coordinates). In this way, events with known DOI's and known photon energy are created having different lateral positions, with the lateral positions depending on the absorption statistic of the irradiation via the sidewall. By measuring resulting induced negative charges for different DOI's, the negative values of the total induced charge for non-collected adjacent signals may be used to create a look-up table or other relationship for deriving DOI from induced non-collected charge.

It may further be noted that, since the negative value of the induced charge also depends on the energy of the absorbed photon, the calibration may also account for photon energy. For example, the DOI may be calibrated based on a ratio between a negative value of the induced non-collected signal and the amplitude of the primary or collected signal. Such a ratio in various embodiments may be expressed as the following:

$$DOI \propto \frac{V_{[negative\ value\ of\ the\ induced\ charge]}}{V_{[amplitude\ of\ the\ primary\ signal]}}$$

Since the negative value of the induced signal is independent (or essentially or substantially independent as discussed herein) of the lateral position (or X,Y coordinates), all of the adjacent or neighboring pixels will produce similar negative signals. Accordingly, signal-to-noise ration may be improved by adding the negative signal from a number of adjacent or neighboring pixels. Such a ratio in various embodiments may be $$DOI \propto \frac{\sum_{i=1}^{i=N} V[negative\ value\ of\ the\ induced\ charge]_i}{V_{[amplitude\ of\ the\ primary\ signal]}}$$

It may be noted that the negative induced charge or signal of an adjacent pixel and the primary signal in various embodiments are measured after shapers that are configured to shape the received or acquired signals. In various embodiments both signals have a generally step-like shape and generally similar peaking and shaping times. Accordingly, the ratio between the signals may be about the same either after the shapers or immediately after amplifiers from which the shapers receive the signals.

Figure 11:
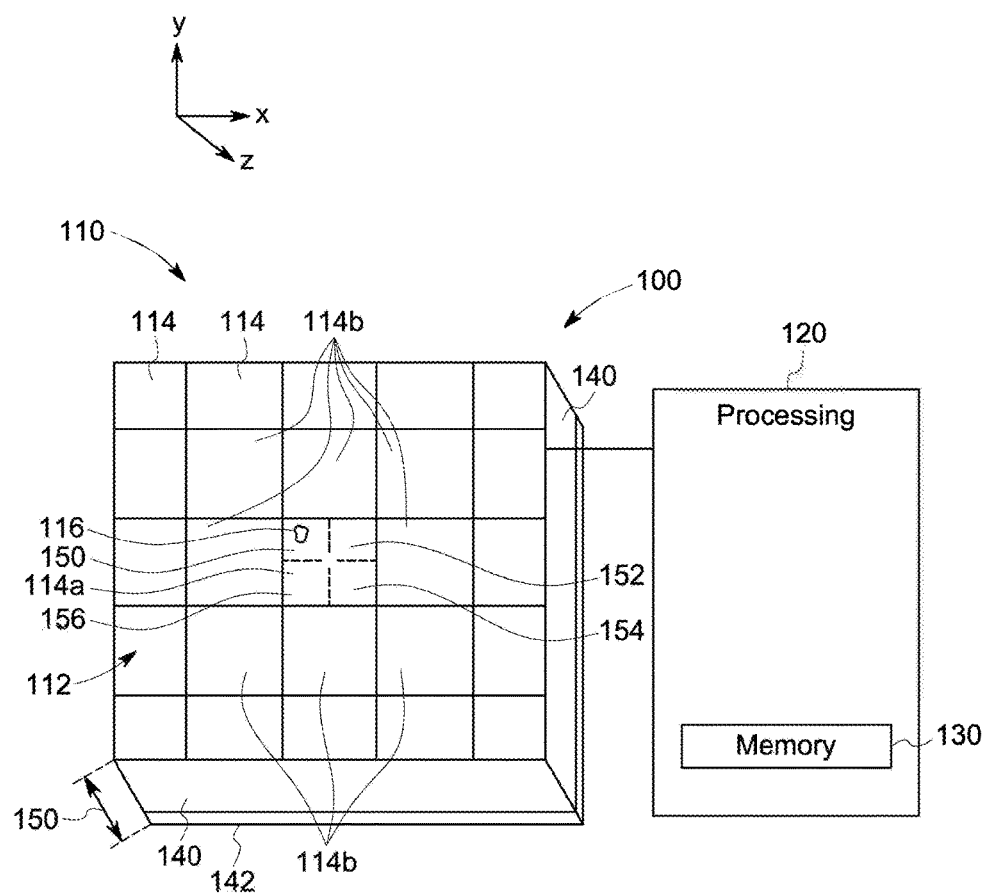
FIG. 11 provides a schematic view of a radiation detector assembly in accordance with various embodiments.

FIG. 11 provides a schematic view of a radiation detector assembly 100 in accordance with various embodiments. As seen in FIG. 11, the radiation detector assembly 100 includes a semiconductor detector 110 and a processing unit 120. The semiconductor detector 110 has a surface 112 on which plural pixelated anodes 114 are disposed. In the depicted embodiment, a cathode 142 is disposed on a surface opposite the surface 112 on which the pixelated anodes 114 are disposed. For example, a single cathode may be deposited on one surface with the pixelated anodes disposed on an opposite surface. Generally, when radiation (e.g., one or more photons) impacts the pixelated anodes 114, the semiconductor detector 110 generates electrical signals corresponding to the radiation penetrating via the surface of cathode 142 and being absorbed in the volume of detector 110 under surface 112. In the illustrated embodiment, the pixelated anodes 114 are shown in a 5×5 array for a total of 25 pixelated anodes 114; however, it may be noted that other numbers or arrangements of pixelated anodes may be used in various embodiments. Each pixelated anode 114, for example, may have a surface area of 2.5 millimeters square; however, other sizes and/or shapes may be employed in various embodiments.

The semiconductor detector 110 in various embodiments may be constructed using different materials, such as semiconductor materials, including Cadmium Zinc Telluride (CdZnTe), often referred to as CZT, Cadmium Telluride (CdTe), and Silicon (Si), among others. The detector 110 may be configured for use with, for example, nuclear medicine (NM) imaging systems, positron emission tomography (PET) imaging systems, and/or single photon emission computed tomography (SPECT) imaging systems.

In the illustrated embodiment, each pixelated anode 114 generates different signals depending on the lateral location (e.g., in the X, Y directions) of where a photon is absorbed in the volume of detector 110 under the surface 112. For example, each pixelated anode 114 generates a primary or collected signal responsive to the absorption of a photon in the volume of detector 110 under the particular pixelated anode 114 through which the photon penetrates into the detector volume. The volumes of detector 110 under pixelated anodes 114 are defined as voxels (not shown). For each pixelated anode 114, detector 110 has the corresponding voxel. The absorption of a photon by a certain voxel corresponding to a particular pixelated anode 114a also results in an induced charge that may be detected by pixels 114b adjacent to or surrounding the particular pixelated anode 114a that receives the photon. The charge detected by an adjacent or surrounding pixel may be referred to herein as a non-collected charge, and result in a non-collected or secondary signal. A primary signal may include information regarding photon energy (e.g., a distribution across a range of energy levels) as well as location information corresponding to the particular pixelated anode 114 at which a photon penetrates via the surface of cathode 142 and is absorbed in the corresponding voxel.

For example, in FIG. 1, a photon 116 is shown impacting the pixelated anode 114a to be absorbed in the corresponding voxel. Accordingly, the pixelated anode 114a generates a primary signal responsive to reception of the photon 116. As also seen in FIG. 1, pixelated anodes 114b are adjacent to the pixelated anode 114a. Pixelated anode 114a has 8 adjacent pixelated anodes 114b. When the pixelated anode 114a is impacted by the photon 116, a charge is induced in and collected by the pixelated anode 114a to produce the primary signal. One or more of the adjacent pixelated anodes 114b generates a secondary signal responsive to the induced charge generated in and collected by the pixelated anode 114a, which produces the primary signal. The secondary signal has an amplitude that is smaller than the primary signal. For any given photon, the corresponding primary signal (from the impacted pixel) and secondary signals (from one or more pixels adjacent to the impacted pixel)

may be used to locate the reception point of a photon at a particular location within the pixel (e.g., to identify a particular sub-pixel location within the pixel).

As seen in FIG. 11, sidewalls 140 extend along a depth 150 in the Z direction between the surface 112 and the cathode 142. The location along the Z direction along the depth 150 of absorption where the photon 116 is absorbed is the DOI for the corresponding event. As discussed herein, the negative induced non-collected charge on one or more adjacent pixelated anodes 114b is used in the illustrated embodiment to determine the DOI for the event corresponding to the impact of the photon 116.

Each pixelated anode 114 may have associated therewith one or more electronics channels configured to provide the primary and secondary signals to one or more aspects of the processing unit 120 in cooperation with the pixelated anodes. In some embodiments, all or a portion of each electronics channel may be disposed on the detector 110. Alternatively or additionally, all or a portion of each electronics channel may be housed externally to the detector 110, for example as part of the processing unit 120, which may be or include an Application Specific Integration Circuit (ASIC). The electronics channels may be configured to provide the primary and secondary signals to one or more aspects of the processing unit 120 while discarding other signals. For example, in some embodiments, each electronics channel includes a threshold discriminator. The threshold discriminator may allow signals exceeding a threshold level to be transmitted while preventing or inhibiting transmission of signals that do not exceed a threshold level. Generally, the threshold level is set low enough to reliably capture the secondary signals, while still being set high enough to exclude lower strength signals, for example due to noise. It may be noted that, because the secondary signals may be relatively low in strength, the electronics utilized are preferably low noise electronics to reduce or eliminate noise that is not eliminated by the threshold level. In some embodiments, each electronic channel includes a peak-and-hold unit to store electrical signal energy, and may also include a readout mechanism. For example, the electronic channel may include a request-acknowledge mechanism that allows the peak-and-hold energy and pixel location for each channel to be read out individually. Further, in some embodiments, the processing unit 120 or other processor may control the signal threshold level and the request-acknowledge mechanism.

In the illustrated embodiment, the processing unit 120 is operably coupled to the pixelated anodes 114, and is configured to acquire primary signals (for collected charges) and secondary signals (for non-collected charges). For example, the processing unit 120 in various embodiments acquires a primary signal from one of the anodes responsive to reception of a photon by the anode. For example, a primary signal may be acquired from pixelated anode 114a responsive to reception of the photon 116. The processing unit 120 also acquires at least one secondary signal from at least one neighboring pixel (e.g., at least one adjacent anode 114b) responsive to an induced charge caused by the reception of the photon. For example, a secondary signal may be acquired from one or more of the adjacent pixels 114b responsive to reception of the photon 116. It may be noted that the secondary signal (or signals) and primary signal generated responsive to reception of the photon 116 may be associated with each other based on timing and location of detection of the corresponding charges.

The depicted processing unit 120 is also configured to determine a depth of interaction (DOI) in the semiconductor detector 110 for the reception of the photon using (e.g., based on) the at least one secondary signal. For example, a DOI along the depth 150 where the photon 116 is absorbed may be determined. In some embodiments, a total negative induced non-collected charge for the at least one secondary signal may be determined, and used to determine the DOI as discussed herein. In various embodiments, a lookup table or other correlation may be used to determine the DOI from a determined total negative induced non-collected charge for the at least one secondary signal. It may be noted that in various embodiments, the processing unit 120 determines the DOI using only signals generated based on information from the pixelated anodes 114, and without using any information from the cathode 142. Accordingly, construction and/or assembly of the detector assembly 100 may be avoid or eliminate any hardware or electrical connections that would otherwise be necessary for acquiring signals from the cathode 142 for use in determining DOI. Additionally, acquisitional and/or processing complexity or requirements may be further reduced by using the same information (primary and secondary signals) as discussed herein to determine both DOI and sub-pixel location.

The determined DOI may be utilized to improve image quality. For example, the determined DOI may be used to correct or adjust acquired imaging information. In some embodiments, the processing unit 120 is configured to adjust an energy level for an event corresponding to the reception of a photon by an anode based on the DOI. It may be noted that charge loss for a detected event depends on the distance of the absorption for the event from the anode. Accordingly, the DOI for a number of events may be used to adjust for charge loss to make the energy levels for the events more uniform and/or closer to a photopeak for accurate identification of events and accurate counting of events.

Alternatively or additionally, the processing unit 120 may be configured to reconstruct an image using the DOI. For example, the DOI of a number of events may be used directly by a reconstruction technique to utilize 3D positioning of events in the detector for reconstruction. As another example, the DOI may be used indirectly by a reconstruction technique via use of the DOI to correct energy levels, and then using the corrected energy levels for image reconstruction.

As discussed herein, calibration information is utilized in various embodiments. The processing unit 120 in various embodiments is configured to use calibration information (see, e.g., FIG. 10 and related discussion) to determine the DOI. The calibration may be in the form of a look up table or other relationship stored or otherwise associated with or accessible by the processing unit 120 (e.g., stored in memory 130). In some embodiments, the processing unit 120 is configured to determine the DOI using a calibration based on a ratio between a negative value of a single secondary signal and an amplitude of the primary signal. (See FIG. 10 and related discussion.) As another example, in some embodiments, the processing unit 120 is configured to determine the DOI using a calibration based on a ratio between a sum or combination of negative values for plural secondary signals (e.g., signals from a number of adjacent pixels 114b) and an amplitude of the primary signal. (See FIG. 10 and related discussion.)

In various embodiments, the processing unit 120 may also be configured to determine a sub-pixel location (e.g., a lateral location) for events using the primary signal and at least one secondary signal in addition to determining the DOI. The sub-pixel location and the DOI may be determined using the same primary signal and at least one secondary signal, providing for efficient determination of both. For example, the depicted example processing unit 120 is configured to define sub-pixels for each pixelated anode. It may be noted that the sub-pixels in the illustrated embodiment (depicted as separated by dashed lines) are not physically separate, but instead are virtual entities defined by the processing unit 120. Generally, the use of increasing numbers of sub-pixels per pixel improves resolution while also increasing computational or processing requirements. The particular number of sub-pixels defined or employed in a given application may be selected based on a balance between improved resolution against increased processing requirements. In various embodiments, the use of virtual sub-pixels as discussed herein provides improved resolution while avoiding or reducing costs associated with increasingly larger number of increasingly smaller pixelated anodes.

In the illustrated embodiment, the pixelated anode 114a is shown as divided into four sub-pixels, namely sub-pixel 150, sub-pixel 152, sub-pixel 154, and sub-pixel 156. While sub-pixels are shown in FIG. 11 for only pixelated anode 114a for clarity and ease of illustration, it may be noted that the processing unit 120 in the illustrated embodiment also defines corresponding sub-pixels for each of the remaining pixelated anodes 114. As seen in FIG. 11, the photon 116 is impacting a portion of the pixelated anode 114a defined by the virtual sub-pixel 150.

In the illustrated embodiment, the processing unit 120 acquires the primary signal for a given acquisition event (e.g., impact of a photon) from the pixelated anode 114a, along with timing (e.g., timestamp) information corresponding to a time of generation of the primary signal and location information identifying the pixelated anode 114a as the pixelated anode corresponding to the primary signal. For example, an acquisition event such as a photon impacting a pixelated anode 114 may result in a number of counts occurring across a range or spectrum of energies, with the primary signal including information describing the distribution of counts across the range or spectrum of energies. The processing unit 120 also acquires one or more secondary signals for the acquisition event from the pixelated anodes 114b, along with timestamp information and location information for the secondary signal(s). The processing unit 120 then determines the location for the given acquisition event identifying the pixelated anode 114a as the impacted pixelated anode 114a, and then determining which of sub-pixels 150, 152, 154, 156 define the location of impact for the acquisition event. Using conventional methods, the location of sub-pixels 150, 152, 154, 156 may be derived based on the location (e.g., associated pixelated anode) and the relationships between the strengths of the primary signal in the associated pixelated anode 114a and the secondary signal(s) in the adjacent pixelated anodes 114b for the acquisition event. The processing unit 120 may use time stamp information as well as location information to associate the primary signal and secondary signals generated responsive to the given acquisition event with each other, and to discriminate the primary signal and secondary signals for the given acquisition event from signals for other acquisition events occurring during a collection or acquisition period using the time stamp and location information. Accordingly, the use of time stamp information helps allow for distinguishing between the primary signal and its corresponding secondary signals from random coincidence that may occur between primary signals of adjacent pixels, since the timestamps from the primary signal and its corresponding secondary signals are correlated for a particular acquisition event.

Additional discussion regarding virtual sub-pixels and the use of virtual sub-pixels, and the use of collected and non-collected charge signals may be found in U.S. patent application Ser. No. 14/724,022, entitled "Systems and Method for Charge-Sharing Identification and Correction Using a Single Pixel," filed 28 May 2015 ("the 022 Application); U.S. patent application Ser. No. 15/280,640, entitled "Systems and Methods for Sub-Pixel Location Determination," filed 29 Sep. 2016 ("the 640 Application"); and U.S. patent application Ser. No. 14/627,436, entitled "Systems and Methods for Improving Energy Resolution by Sub-Pixel Energy Calibration," filed 20 Feb. 2015 ("the 436 Application). The subject matter of each of the 022 Application, the 640 Application, and the 436 Application are incorporated by reference in its entirety.

In various embodiments the processing unit 120 includes processing circuitry configured to perform one or more tasks, functions, or steps discussed herein. It may be noted that "processing unit" as used herein is not intended to necessarily be limited to a single processor or computer. For example, the processing unit 120 may include multiple processors, ASIC's, FPGA's, and/or computers, which may be integrated in a common housing or unit, or which may distributed among various units or housings. It may be noted that operations performed by the processing unit 120 (e.g., operations corresponding to process flows or methods discussed herein, or aspects thereof) may be sufficiently complex that the operations may not be performed by a human being within a reasonable time period. For example, the determination of values of collected and non-collected charges, and/or the determination of DOI's and/or sub-pixel locations based on the collected and/or non-collected charges within the time constraints associated with such signals may rely on or utilize computations that may not be completed by a person within a reasonable time period.

The depicted processing unit 120 includes a memory 130. The memory 130 may include one or more computer readable storage media. The memory 130, for example, may store mapping information describing the sub-pixel locations, acquired emission information, image data corresponding to images generated, results of intermediate processing steps, calibration parameters or calibration information (e.g., a lookup table correlating negative induced charge value to DOI), or the like. Further, the process flows and/or flowcharts discussed herein (or aspects thereof) may represent one or more sets of instructions that are stored in the memory 130 for direction of operations of the radiation detection assembly 100.

Figure 12:
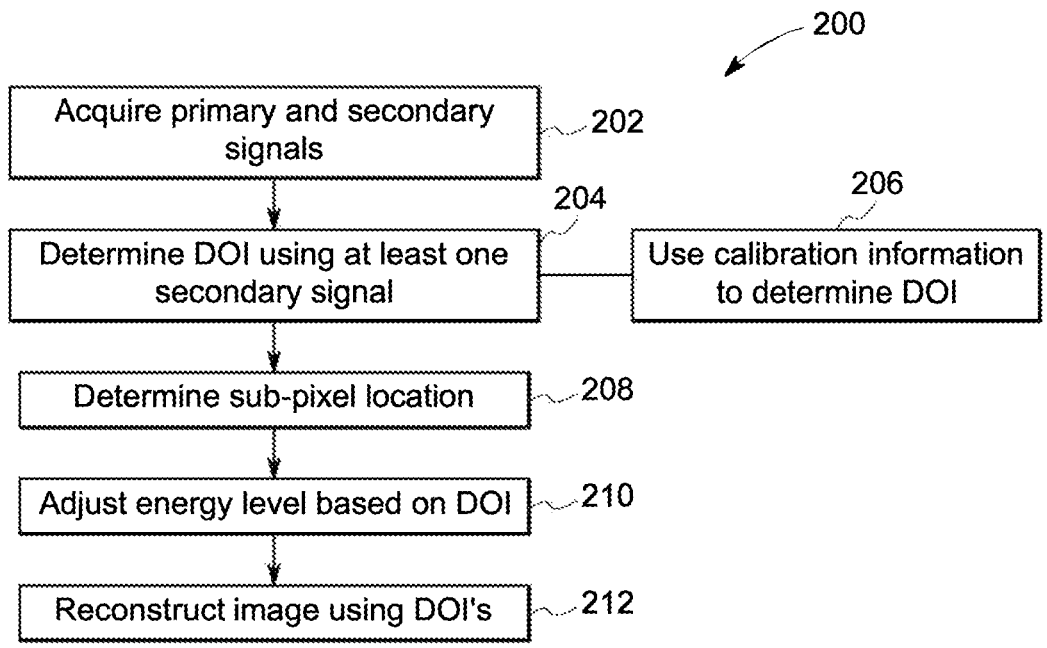
FIG. 12 provides a flowchart of a method in accordance with various embodiments.

FIG. 12 provides a flowchart of a method 200 (e.g., for determining DOI), in accordance with various embodiments. The method 200, for example, may employ or be performed by structures or aspects of various embodiments (e.g., systems and/or methods and/or process flows) discussed herein. In various embodiments, certain steps may be omitted or added, certain steps may be combined, certain steps may be performed concurrently, certain steps may be split into multiple steps, certain steps may be performed in a different order, or certain steps or series of steps may be re-performed in an iterative fashion. In various embodiments, portions, aspects, and/or variations of the method 200 may be able to be used as one or more algorithms to direct hardware (e.g., one or more aspects of the processing unit 120) to perform one or more operations described herein.

At 202, primary signals and secondary signals are acquired corresponding to acquisition events (e.g., events corresponding to reception of photons). The primary and secondary signals are generated responsive to reception of photons by a semiconductor detector, and are received from pixelated anodes (e.g., anodes of a semiconductor device of an imaging system such as assembly 100). For example, a patient that has been administered at least one radiopharmaceutical may be placed within a field of view of one or more detectors, and radiation (e.g., photons) emitted from the patient may impact the pixelated anodes disposed on reception surfaces of the one or more detectors resulting in acquisition events (e.g., photon impacts). For a given photon impact in the depicted example embodiment, a primary signal (responsive to a collected charge) is generated by the impacted pixelated anode (or collecting anode), and one or more secondary signals (responsive to non-collected charge) are generated by pixelated anodes adjacent to the impacted pixelated anode (or non-collecting anodes).

At 204, a depth of interaction (DOI) in the semiconductor device is determined for the acquisition events resulting in the primary and secondary signals acquired at 202. In various embodiments, the DOI for a given event is determined using at least one secondary signal for that particular event. For example, as discussed herein, the DOI in various embodiments is determined based on a total negative induced non-collected charge value from one or more adjacent or non-collecting pixels (e.g., at least one adjacent pixelated anode). It may be noted that the DOI in various embodiments is determined without using any information (e.g., detected charge or corresponding signals) from a cathode of the detector assembly.

In various embodiments, the total negative non-collecting induced charge may be adjusted or corrected to account for variations in semiconductor construction and/or photon energies. For example, in the depicted embodiment, at 206, calibration information is used to determine the DOI. As discussed herein, in some embodiments, the DOI may be determined using a calibration based on a ratio between a negative value of a single secondary signal and an amplitude of the primary signal, and in some embodiments, the DOI may be determined using a calibration based on a ratio between a sum or combination of negative values for plural secondary signals and an amplitude of the primary signal. (See FIG. 10 and related discussion.)

At 208, a sub-pixel location is determined using the primary signal and the at least one secondary signal. For each event, a corresponding sub-pixel location may be determined. It may be noted that the same information (primary and secondary signals) used to determine DOI's for events may also be used to determine sub-pixel locations for those events.

At 210, an energy level for an event is adjusted based on the DOI. For example, as the energy detected may vary based on DOI, the DOI for each acquired event may be used to adjust the corresponding energy levels based on the corresponding DOI's to make the energy levels for a group of events more consistent and/or closer to a target or other predetermined energy level.

At 212, an image is reconstructed using the DOI. For example, corrected energy levels from 210 may be used in the reconstruction of an image. As another example, the DOIs for events may be used to determine 3D positioning information of those events within a detector, with the 3D positioning information used to reconstruct an image.

Figure 13:
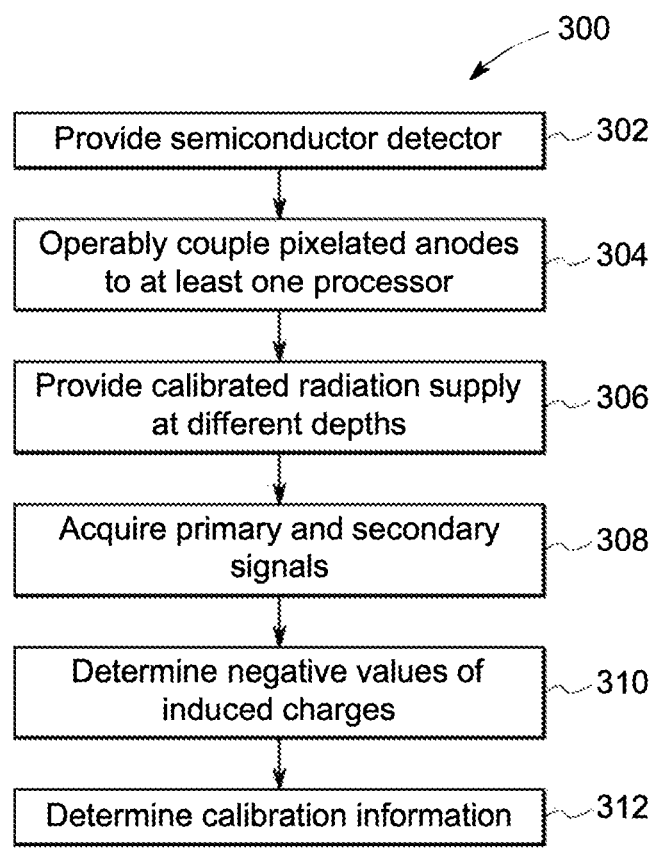
FIG. 13 provides a flowchart of a method in accordance with various embodiments.

As discussed herein, a radiation detector system (e.g., a system configured to determine DOI using secondary signals corresponding to non-collected induced charges) may be calibrated. FIG. 13 provides a flowchart of a method 300 (e.g., for providing and calibrating a radiation detector assembly), in accordance with various embodiments. The method 300, for example, may employ or be performed by structures or aspects of various embodiments (e.g., systems and/or methods and/or process flows) discussed herein. In various embodiments, certain steps may be omitted or added, certain steps may be combined, certain steps may be performed concurrently, certain steps may be split into multiple steps, certain steps may be performed in a different order, or certain steps or series of steps may be re-performed in an iterative fashion. In various embodiments, portions, aspects, and/or variations of the method 300 may be able to be used as one or more algorithms to direct hardware (e.g., one or more aspects of the processing unit 120) to perform one or more operations described herein.

At 302, a semiconductor detector (e.g., semiconductor detector 110 of radiation imaging assembly 100) is provided. The semiconductor detector of the illustrated example has a surface with plural pixelated anodes disposed on the surface. Each pixelated anode is configured to generate a primary signal responsive to reception of a photon by the pixelated anode and to generate at least one secondary signal responsive to an induced charge caused by reception of a photon by at least one adjacent anode. At 304, the pixelated anodes are operably coupled to at least one processor (e.g., processing unit 120).

At 306, a calibrated radiation supply (e.g., having a known photon energy) is provided at different depths along a sidewall of the semiconductor detector. Responsive to reception of the calibrated radiation supply, the pixelated anodes generate primary and secondary signals. For example, the calibrated radiation supply may be passed through a pin-hole collimator to the sidewall of the semiconductor detector. The location of a given pin-hole (e.g., in a Z direction) through which radiation is passed may be used to determine the DOI at which the corresponding radiation is passed from the collimator and received by the semiconductor detector. At 308, the primary and secondary signals are acquired from the pixelated anodes by the at least one processor.

At 310, corresponding negative values of total induced charges for each of the different depths at which the radiation has been supplied are determined. At 312, calibration information (e.g., a look-up table or other correlating relationship between DOI's and negative induced non-collected charge values) is determined.

Figure 14:
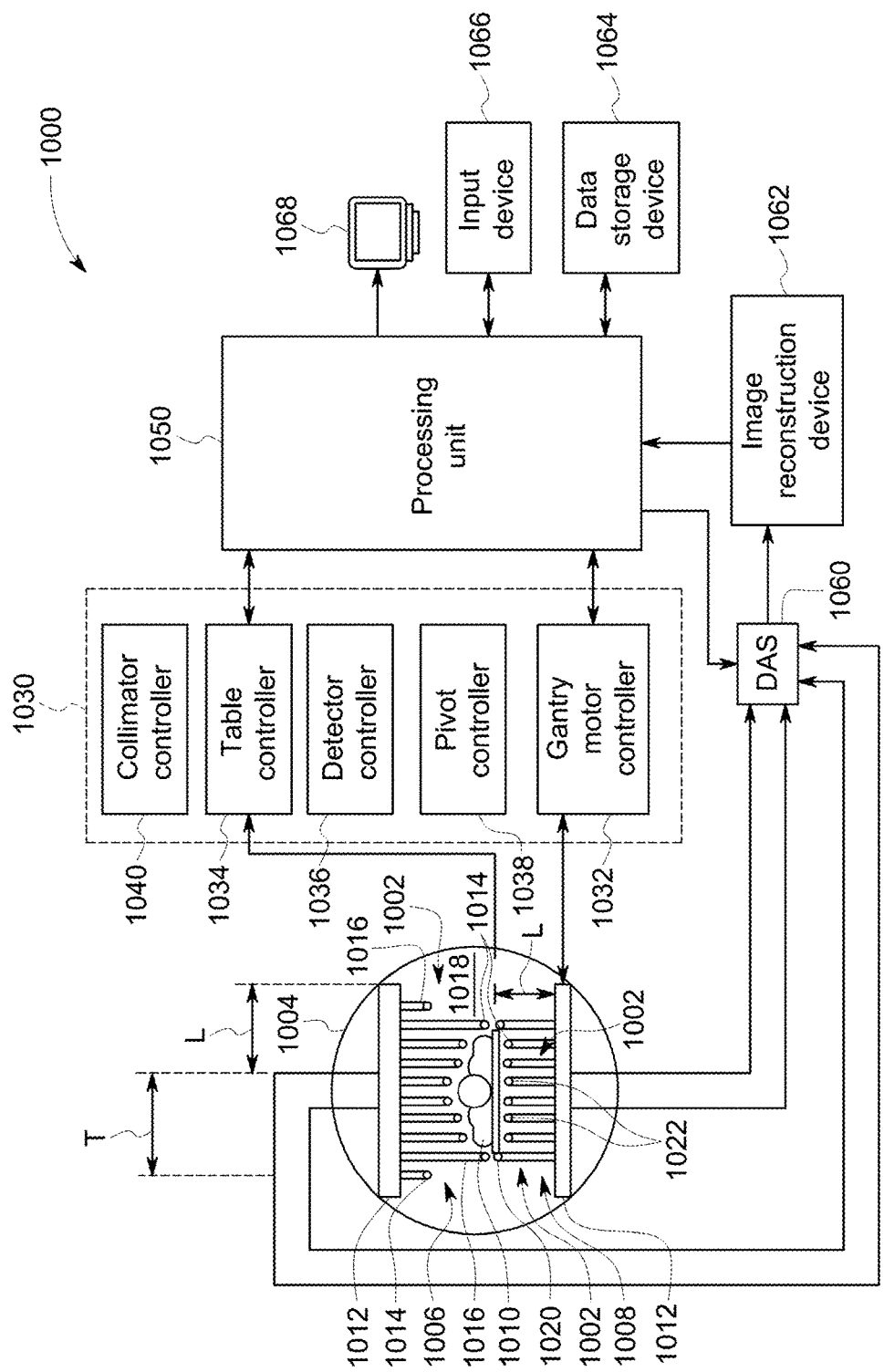
FIG. 14 provides a schematic view of an imaging system in accordance with various embodiments.

FIG. 14 is a schematic illustration of a NM imaging system 1000 having a plurality of imaging detector head assemblies mounted on a gantry (which may be mounted, for example, in rows, in an iris shape, or other configurations, such as a configuration in which the movable detector carriers 1016 are aligned radially toward the patient-body 1010). In particular, a plurality of imaging detectors 1002 are mounted to a gantry 1004. In the illustrated embodiment, the imaging detectors 1002 are configured as two separate detector arrays 1006 and 1008 coupled to the gantry 1004 above and below a subject 1010 (e.g., a patient), as viewed in FIG. 14. The detector arrays 1006 and 1008 may be coupled directly to the gantry 1004, or may be coupled via support members 1012 to the gantry 1004 to allow movement of the entire arrays 1006 and/or 1008 relative to the gantry 1004 (e.g., transverse translating movement in the left or right direction as viewed by arrow T in FIG. 14). Additionally, each of the imaging detectors 1002 includes a detector unit 1014, at least some of which are mounted to a movable detector carrier 1016 (e.g., a support arm or actuator that may be driven by a motor to cause movement thereof) that extends from the gantry 1004. In some embodiments, the detector carriers 1016 allow movement of the detector units 1014 towards and away from the subject 1010, such as linearly. Thus, in the illustrated embodiment the detector arrays 1006 and 1008 are mounted in parallel above and below the subject 1010 and allow linear movement of the detector units 1014 in one direction (indicated by the arrow L), illustrated as perpendicular to the support member 1012 (that are coupled generally horizontally on the gantry 1004). However, other configurations and orientations are possible as described herein. It should be noted that the movable detector carrier 1016 may be any type of support that allows movement of the detector units 1014 relative to the support member 1012 and/or gantry 1004, which in various embodiments allows the detector units 1014 to move linearly towards and away from the support member 1012.

Each of the imaging detectors 1002 in various embodiments is smaller than a conventional whole body or general purpose imaging detector. A conventional imaging detector may be large enough to image most or all of a width of a patient's body at one time and may have a diameter or a larger dimension of approximately 50 cm or more. In contrast, each of the imaging detectors 1002 may include one or more detector units 1014 coupled to a respective detector carrier 1016 and having dimensions of, for example, 4 cm to 20 cm and may be formed of Cadmium Zinc Telluride (CZT) tiles or modules. For example, each of the detector units 1014 may be 8×8 cm in size and be composed of a plurality of CZT pixelated modules (not shown). For example, each module may be 4×4 cm in size and have 16×16=256 pixels. In some embodiments, each detector unit 1014 includes a plurality of modules, such as an array of 1×7 modules. However, different configurations and array sizes are contemplated including, for example, detector units 1014 having multiple rows of modules.

It should be understood that the imaging detectors 1002 may be different sizes and/or shapes with respect to each other, such as square, rectangular, circular or other shape. An actual field of view (FOV) of each of the imaging detectors 1002 may be directly proportional to the size and shape of the respective imaging detector.

The gantry 1004 may be formed with an aperture 1018 (e.g., opening or bore) therethrough as illustrated. A patient table 1020, such as a patient bed, is configured with a support mechanism (not shown) to support and carry the subject 1010 in one or more of a plurality of viewing positions within the aperture 1018 and relative to the imaging detectors 1002. Alternatively, the gantry 1004 may comprise a plurality of gantry segments (not shown), each of which may independently move a support member 1012 or one or more of the imaging detectors 1002.

The gantry 1004 may also be configured in other shapes, such as a "C", "H" and "L", for example, and may be rotatable about the subject 1010. For example, the gantry 1004 may be formed as a closed ring or circle, or as an open arc or arch which allows the subject 1010 to be easily accessed while imaging and facilitates loading and unloading of the subject 1010, as well as reducing claustrophobia in some subjects 1010.

Additional imaging detectors (not shown) may be positioned to form rows of detector arrays or an arc or ring around the subject 1010. By positioning multiple imaging detectors 1002 at multiple positions with respect to the subject 1010, such as along an imaging axis (e.g., head to toe direction of the subject 1010) image data specific for a larger FOV may be acquired more quickly.

Each of the imaging detectors 1002 has a radiation detection face, which is directed towards the subject 1010 or a region of interest within the subject.

In various embodiments, multi-bore collimators may be constructed to be registered with pixels of the detector units 1014, which in one embodiment are CZT detectors. However, other materials may be used. Registered collimation may improve spatial resolution by forcing photons going through one bore to be collected primarily by one pixel. Additionally, registered collimation may improve sensitivity and energy response of pixelated detectors as detector area near the edges of a pixel or in-between two adjacent pixels may have reduced sensitivity or decreased energy resolution or other performance degradation. Having collimator septa directly above the edges of pixels reduces the chance of a photon impinging at these degraded-performance locations, without decreasing the overall probability of a photon passing through the collimator.

A controller unit 1030 may control the movement and positioning of the patient table 1020, imaging detectors 1002 (which may be configured as one or more arms), gantry 1004 and/or the collimators 1022 (that move with the imaging detectors 1002 in various embodiments, being coupled thereto). A range of motion before or during an acquisition, or between different image acquisitions, is set to maintain the actual FOV of each of the imaging detectors 1002 directed, for example, towards or "aimed at" a particular area or region of the subject 1010 or along the entire subject 1010. The motion may be a combined or complex motion in multiple directions simultaneously, concurrently, or sequentially as described in more detail herein.

The controller unit 1030 may have a gantry motor controller 1032, table controller 1034, detector controller 1036, pivot controller 1038, and collimator controller 1040. The controllers 1030, 1032, 1034, 1036, 1038, 1040 may be automatically commanded by a processing unit 1050, manually controlled by an operator, or a combination thereof. The gantry motor controller 1032 may move the imaging detectors 1002 with respect to the subject 1010, for example, individually, in segments or subsets, or simultaneously in a fixed relationship to one another. For example, in some embodiments, the gantry controller 1032 may cause the imaging detectors 1002 and/or support members 1012 to move relative to or rotate about the subject 1010, which may include motion of less than or up to 180 degrees (or more).

The table controller 1034 may move the patient table 1020 to position the subject 1010 relative to the imaging detectors 1002. The patient table 1020 may be moved in up-down directions, in-out directions, and right-left directions, for example. The detector controller 1036 may control movement of each of the imaging detectors 1002 to move together as a group or individually as described in more detail herein. The detector controller 1036 also may control movement of the imaging detectors 1002 in some embodiments to move closer to and farther from a surface of the subject 1010, such as by controlling translating movement of the detector carriers 1016 linearly towards or away from the subject 1010 (e.g., sliding or telescoping movement). Optionally, the detector controller 1036 may control movement of the detector carriers 1016 to allow movement of the detector array 1006 or 1008. For example, the detector controller 1036 may control lateral movement of the detector carriers 1016 illustrated by the T arrow (and shown as left and right as viewed in FIG. 14). In various embodiments, the detector controller 1036 may control the detector carriers 1016 or the support members 1012 to move in different lateral directions. Detector controller 1036 may control the swiveling motion of detectors 1002 together with their collimators 1022.

The pivot controller 1038 may control pivoting or rotating movement of the detector units 1014 at ends of the detector carriers 1016 and/or pivoting or rotating movement of the detector carrier 1016. For example, one or more of the detector units 1014 or detector carriers 1016 may be rotated about at least one axis to view the subject 1010 from a plurality of angular orientations to acquire, for example, 3D image data in a 3D SPECT or 3D imaging mode of operation. The collimator controller 1040 may adjust a position of an adjustable collimator, such as a collimator with adjustable strips (or vanes) or adjustable pinhole(s).

It should be noted that motion of one or more imaging detectors 1002 may be in directions other than strictly axially or radially, and motions in several motion directions may be used in various embodiment. Therefore, the term "motion controller" may be used to indicate a collective name for all motion controllers. It should be noted that the various controllers may be combined, for example, the detector controller 1036 and pivot controller 1038 may be combined to provide the different movements described herein.

Prior to acquiring an image of the subject 1010 or a portion of the subject 1010, the imaging detectors 1002, gantry 1004, patient table 1020 and/or collimators 1022 may be adjusted, such as to first or initial imaging positions, as well as subsequent imaging positions. The imaging detectors 1002 may each be positioned to image a portion of the subject 1010. Alternatively, for example in a case of a small size subject 1010, one or more of the imaging detectors 1002 may not be used to acquire data, such as the imaging detectors 1002 at ends of the detector arrays 1006 and 1008, which as illustrated in FIG. 14 are in a retracted position away from the subject 1010. Positioning may be accomplished manually by the operator and/or automatically, which may include using, for example, image information such as other images acquired before the current acquisition, such as by another imaging modality such as X-ray Computed Tomography (CT), MM, X-Ray, PET or ultrasound. In some embodiments, the additional information for positioning, such as the other images, may be acquired by the same system, such as in a hybrid system (e.g., a SPECT/CT system). Additionally, the detector units 1014 may be configured to acquire non-NM data, such as x-ray CT data. In some embodiments, a multi-modality imaging system may be provided, for example, to allow performing NM or SPECT imaging, as well as x-ray CT imaging, which may include a dual-modality or gantry design as described in more detail herein.

After the imaging detectors 1002, gantry 1004, patient table 1020, and/or collimators 1022 are positioned, one or more images, such as three-dimensional (3D) SPECT images are acquired using one or more of the imaging detectors 1002, which may include using a combined motion that reduces or minimizes spacing between detector units 1014. The image data acquired by each imaging detector 1002 may be combined and reconstructed into a composite image or 3D images in various embodiments.

In one embodiment, at least one of detector arrays 1006 and/or 1008, gantry 1004, patient table 1020, and/or collimators 1022 are moved after being initially positioned, which includes individual movement of one or more of the detector units 1014 (e.g., combined lateral and pivoting movement) together with the swiveling motion of detectors 1002. For example, at least one of detector arrays 1006 and/or 1008 may be moved laterally while pivoted. Thus, in various embodiments, a plurality of small sized detectors, such as the detector units 1014 may be used for 3D imaging, such as when moving or sweeping the detector units 1014 in combination with other movements.

In various embodiments, a data acquisition system (DAS) 1060 receives electrical signal data produced by the imaging detectors 1002 and converts this data into digital signals for subsequent processing. However, in various embodiments, digital signals are generated by the imaging detectors 1002. An image reconstruction device 1062 (which may be a processing device or computer) and a data storage device 1064 may be provided in addition to the processing unit 1050. It should be noted that one or more functions related to one or more of data acquisition, motion control, data processing and image reconstruction may be accomplished through hardware, software and/or by shared processing resources, which may be located within or near the imaging system 1000, or may be located remotely. Additionally, a user input device 1066 may be provided to receive user inputs (e.g., control commands), as well as a display 1068 for displaying images. DAS 1060 receives the acquired images from detectors 1002 together with the corresponding lateral, vertical, rotational and swiveling coordinates of gantry 1004, support members 1012, detector units 1014, detector carriers 1016, and detectors 1002 for accurate reconstruction of an image including 3D images and their slices.

Figure 15:
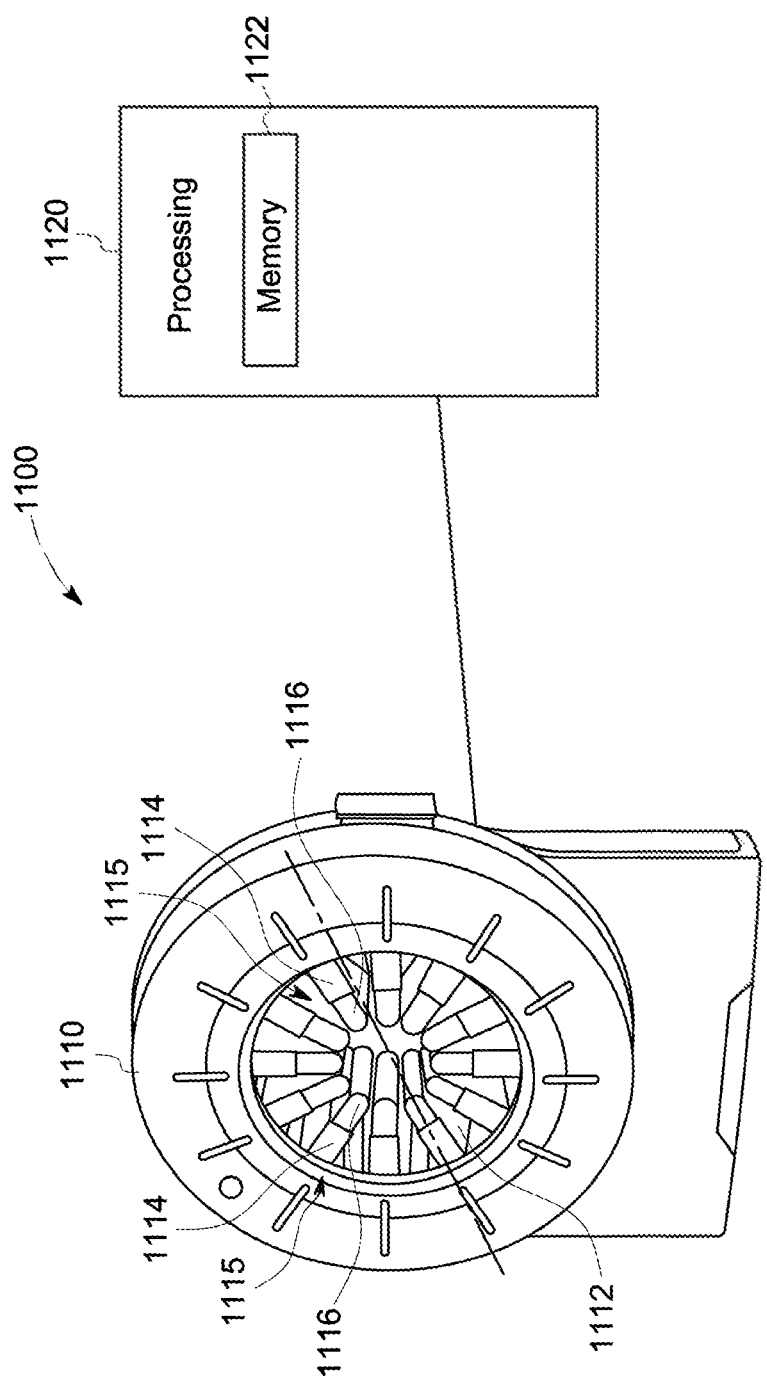
FIG. 15 provides a schematic view of an imaging system in accordance with various embodiments.

It may be noted that the embodiment of FIG. 14 may be understood as a linear arrangement of detector heads (e.g., utilizing detector units arranged in a row and extending parallel to one another. In other embodiments, a radial design may be employed. Radial designs, for example, may provide additional advantages in terms of efficiently imaging smaller objects, such as limbs, heads, or infants. FIG. 15 provides a schematic view of a nuclear medicine (NM) multi-head imaging system 1100 in accordance with various embodiments. Generally, the imaging system 1100 is configured to acquire imaging information (e.g., photon counts) from an object to be imaged (e.g., a human patient) that has been administered a radiopharmaceutical. The depicted imaging system 1100 includes a gantry 1110 having a bore 1112 therethrough, plural radiation detector head assemblies 1115, and a processing unit 1120.

The gantry 1110 defines the bore 1112. The bore 1112 is configured to accept an object to be imaged (e.g., a human patient or portion thereof). As seen in FIG. 15, plural radiation detector head assemblies 1115 are mounted to the gantry 1110. In the illustrated embodiment, each radiation detector head assembly 1115 includes an arm 1114 and a head 1116. The arm 1114 is configured to articulate the head 1116 radially toward and/or away from a center of the bore 1112 (and/or in other directions), and the head 1116 includes at least one detector, with the head 1116 disposed at a radially inward end of the arm 1114 and configured to pivot to provide a range of positions from which imaging information is acquired.

The detector of the head 1116, for example, may be a semiconductor detector. For example, a semiconductor detector various embodiments may be constructed using different materials, such as semiconductor materials, including Cadmium Zinc Telluride (CdZnTe), often referred to as CZT, Cadmium Telluride (CdTe), and Silicon (Si), among others. The detector may be configured for use with, for example, nuclear medicine (NM) imaging systems, positron emission tomography (PET) imaging systems, and/or single photon emission computed tomography (SPECT) imaging systems.

In various embodiments, the detector may include an array of pixelated anodes, and may generate different signals depending on the location of where a photon is absorbed in the volume of the detector under a surface if the detector. The volumes of the detector under the pixelated anodes are defined as voxels. For each pixelated anode, the detector has a corresponding voxel. The absorption of photons by certain voxels corresponding to particular pixelated anodes results in charges generated that may be counted. The counts may be correlated to particular locations and used to reconstruct an image.

In various embodiments, each detector head assembly 1115 may define a corresponding view that is oriented toward the center of the bore 1112. Each detector head assembly 1115 in the illustrated embodiment is configured to acquire imaging information over a sweep range corresponding to the view of the given detector unit. Additional details regarding examples of systems with detector units disposed radially around a bore may be found in U.S. patent application Ser. No. 14/788,180, filed 30 Jun. 2015, entitled "Systems and Methods For Dynamic Scanning With Multi-Head Camera," the subject matter of which is incorporated by reference in its entirety.

The processing unit 1120 includes memory 1122. The imaging system 1100 is shown as including a single processing unit 1120; however, the block for the processing unit 1120 may be understood as representing one or more processors that may be distributed or remote from each other. The depicted processing unit 1120 includes processing circuitry configured to perform one or more tasks, functions, or steps discussed herein. It may be noted that "processing unit" as used herein is not intended to necessarily be limited to a single processor or computer. For example, the processing unit 1120 may include multiple processors and/or computers, which may be integrated in a common housing or unit, or which may distributed among various units or housings.

Generally, various aspects (e.g., programmed modules) of the processing unit 1120 act individually or cooperatively with other aspects to perform one or more aspects of the methods, steps, or processes discussed herein. In the depicted embodiment, the memory 1122 includes a tangible, non-transitory computer readable medium having stored thereon instructions for performing one or more aspects of the methods, steps, or processes discussed herein.

It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid-state drive, optical disk drive, and the like. The storage device may also be other similar means for loading computer programs or other instructions into the computer or processor.

As used herein, the term "computer" or "module" may include any processor-based or microprocessor-based system including systems using microcontrollers, reduced instruction set computers (RISC), ASICs, logic circuits, and any other circuit or processor capable of executing the functions described herein. The above examples are exemplary only, and are thus not intended to limit in any way the definition and/or meaning of the term "computer".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, and denotes structural requirements of any structure, limitation, or element that is described as being "configured to" perform the task or operation. For example, a processing unit, processor, or computer that is "configured to" perform a task or operation may be understood as being particularly structured to perform the task or operation (e.g., having one or more programs or instructions stored thereon or used in conjunction therewith tailored or intended to perform the task or operation, and/or having an arrangement of processing circuitry tailored or intended to perform the task or operation). For the purposes of clarity and the avoidance of doubt, a general purpose computer (which may become "configured to" perform the task or operation if appropriately programmed) is not "configured to" perform a task or operation unless or until specifically programmed or structurally modified to perform the task or operation.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof)

may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f) unless and until such claim limitations expressly use the phrase "means for" followed by a statement of function void of further structure.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal languages of the claims.

What is claimed is:

1. A radiation detector assembly comprising:
   a semiconductor detector having a surface;
   plural pixelated anodes disposed on the surface, each pixelated anode configured to generate a primary signal responsive to reception of a photon by the pixelated anode and to generate at least one secondary signal responsive to an induced charge caused by reception of a photon by at least one surrounding anode; and
   at least one processor operably coupled to the pixelated anodes, the at least one processor configured to:
      acquire a primary signal from one of the anodes responsive to reception of a photon by the one of the anodes;
      acquire at least one secondary signal from at least one neighboring pixel of the one of the anodes responsive to an induced charge caused by the reception of the photon by the one of the anodes, the at least one secondary signal defining a plot of energy against detector depth, wherein at least a portion of the plot has a negative value; and
      determine a depth of interaction in the semiconductor detector for the reception of the photon by the one of the anodes using the negative value of the at least one secondary signal.

2. The detector assembly of claim 1, wherein the at least one processor is configured to adjust an energy level for an event corresponding to the reception of the photon by the one of the anodes based on the depth of interaction.

3. The detector assembly of claim 1, wherein the at least one processor is configured to reconstruct an image using the depth of interaction.

4. The detector assembly of claim 1, wherein the at least one neighboring pixel includes at least one adjacent anode.

5. The detector assembly of claim 1, wherein the at least one processor is configured to use calibration information to determine the depth of interaction.

6. The detector assembly of claim 5, wherein the at least one processor is configured to determine the depth of interaction using a calibration based on a ratio between the negative value of the at least one secondary signal and an amplitude of the primary signal.

7. The detector assembly of claim 5, wherein the at least one processor is configured to determine the depth of interaction using a calibration based on a ratio between a sum of negative values for plural secondary signals and an amplitude of the primary signal.

8. The detector assembly of claim 1, wherein the at least one processor is configured to determine the depth of interaction without using any information from a cathode of the detector assembly.

9. The detector assembly of claim 1, wherein the at least one processor is configured to determine a sub-pixel location using the primary signal and the at least one secondary signal.

10. A method of imaging using a semiconductor detector having a surface with plural pixelated anodes disposed thereon, wherein each pixelated anode is configured to generate a primary signal responsive to reception of a photon by the pixelated anode and to generate at least one secondary signal responsive to an induced charge caused by reception of a photon by at least one surrounding anode, the method comprising:
   acquiring a primary signal from one of the anodes responsive to reception of a photon by the one of the anodes;
   acquiring at least one secondary signal from at least one neighboring pixel of the one of the anodes responsive to an induced charge caused by the reception of the photon by the one of the anodes, the at least one secondary signal defining a plot of energy against detector depth, wherein at least a portion of the plot has a negative value; and
   determining a depth of interaction in the semiconductor detector for the reception of the photon by the one of the anodes using the negative value of the at least one secondary signal.

11. The method of claim 10, further comprising adjusting an energy level for an event corresponding to the reception of the photon by the one of the anodes based on the depth of interaction.

12. The method of claim 10, further comprising reconstructing an image using the depth of interaction.

13. The method of claim 10, wherein the at least one neighboring pixel includes at least one adjacent anode.

14. The method of claim 10, further comprising using calibration information to determine the depth of interaction.

15. The method of claim 14, further comprising determining the depth of interaction using a calibration based on a ratio between the negative value of the at least one secondary signal and an amplitude of the primary signal.

16. The method of claim 14, further comprising determining the depth of interaction using a calibration based on a ratio between a sum of negative values for plural secondary signals and an amplitude of the primary signal.

17. The method of claim 10, further comprising determining the depth of interaction without using any information from a cathode of the detector assembly.

18. The method of claim 10, further comprising determining a sub-pixel location using the primary signal and the at least one secondary signal.

19. A method of providing a radiation detector assembly comprising:

provides a semiconductor detector having a surface with plural pixelated anodes disposed thereon, each pixelated anode configured to generate a primary signal responsive to reception of a photon by the pixelated anode and to generate at least one secondary signal responsive to an induced charge caused by reception of a photon by at least one adjacent anode;

operably coupling the pixelated anodes to at least one processor;

providing a calibrated radiation supply at different depths along a sidewall of the semiconductor detector, wherein the pixelated anodes generate primary signals and secondary signals responsive to the calibrated radiation supply, the secondary signals defining corresponding plots of energy against detector depth, wherein at least a portion of the plots have negative values;

acquiring, with the at least one processor, the primary signals and the secondary signals from the pixelated anodes;

determining the corresponding negative values of total induced charges for each of the different depths;

determining calibration information based on the negative values of the total induced charges for each of the different depths.

20. The method of 19, further comprising passing the calibrated radiation supply through a pin-hole collimator to the sidewall of the semiconductor detector.

* * * * *